(12) United States Patent
Scalia, Jr.

(10) Patent No.: US 8,126,631 B2
(45) Date of Patent: Feb. 28, 2012

(54) APPARATUS AND METHOD FOR FUEL FLOW RATE, FUEL TEMPERATURE, FUEL DROPLET SIZE, AND BURNER FIRING RATE MODULATION

(75) Inventor: William Henry Scalia, Jr., Dawsonville, GA (US)

(73) Assignee: Econox Technologies, LLC, Newton, MA (US)

( * ) Notice: Subject to any disclaimer, the term of this patent is extended or adjusted under 35 U.S.C. 154(b) by 808 days.

(21) Appl. No.: 12/086,846

(22) PCT Filed: Dec. 22, 2006

(86) PCT No.: PCT/US2006/048943
§ 371 (c)(1),
(2), (4) Date: Jun. 20, 2008

(87) PCT Pub. No.: WO2007/075973
PCT Pub. Date: Jul. 5, 2007

(65) Prior Publication Data
US 2009/0005950 A1    Jan. 1, 2009

Related U.S. Application Data

(60) Provisional application No. 60/753,671, filed on Dec. 22, 2005.

(51) Int. Cl.
*G06F 19/00* (2006.01)
(52) U.S. Cl. ..................................................... 701/101
(58) Field of Classification Search .................... 701/86, 701/100–101, 103–104, 113
See application file for complete search history.

(56) References Cited

U.S. PATENT DOCUMENTS

| | | | |
|---|---|---|---|
| 3,747,338 A | 7/1973 | Tapp | |
| 3,829,281 A | 8/1974 | Briggs et al. | |
| 3,960,121 A * | 6/1976 | Backus | 123/255 |
| 4,325,344 A * | 4/1982 | Igashira et al. | 123/549 |
| 4,396,372 A | 8/1983 | Matumoto et al. | |
| 4,464,108 A | 8/1984 | Korenyi | |
| 4,465,458 A | 8/1984 | Nishino et al. | |
| 4,475,523 A | 10/1984 | Goranflo | |
| 4,483,307 A | 11/1984 | Gilmor | |
| 4,484,887 A | 11/1984 | Pettersson | |
| 5,184,949 A | 2/1993 | O'Brien | |
| 5,988,265 A | 11/1999 | Marthaler | |

(Continued)

FOREIGN PATENT DOCUMENTS
EP    0 489 018 B1    3/1991

*Primary Examiner* — Kim T Nguyen
(74) *Attorney, Agent, or Firm* — Edwards Wildman Palmer LLP; David A. Tucker

(57) ABSTRACT

An apparatus and method for precisely, quickly and substantially uniformly controlling a combustion system by a transfer of heat to a fluidic fuel along a heat/fuel interface having a large surface area substantially immediately prior to the mixing of the fuel with air is provided. The control of the temperature of the fuel input to an air/fuel mixing region of the combustion system provides improved efficiency by an expansion of modulation ranges available for factors that together are determinative of the efficiency of combustion system operation such as fuel flow rate, fuel droplet size, air flow and input fuel pressure. In addition, the fuel/heat interface can be utilized as an in-line fuel flow meter for remote monitoring of the fuel flow rates and the prediction of problems in system functionality and future system failure time frames.

24 Claims, 14 Drawing Sheets

U.S. PATENT DOCUMENTS

| | | |
|---|---|---|
| 6,109,018 A | 8/2000 | Rostrup-Nielsen et al. |
| 6,161,384 A | 12/2000 | Reinbold et al. |
| 6,170,441 B1 | 1/2001 | Haldeman et al. |
| 6,382,959 B2 | 5/2002 | Turk et al. |
| 6,428,375 B2 | 8/2002 | Takayanagi |
| 2004/0145063 A1 | 7/2004 | Sutherland et al. |
| 2004/0219079 A1 | 11/2004 | Hagen et al. |

* cited by examiner

| | Baffle 2 | | | | | | | | | |
|---|---|---|---|---|---|---|---|---|---|---|
| | | 1 | 2 | 3 | 4 | 5 | 6 | 7 | 8 | 9 | 10 |
| Baffle 1 | 1 | 0 | 0.2 | 0.2 | 0.3 | 0.3 | 0.3 | 0.3 | 0.3 | 0.3 | 0.3 |
| | 2 | 0 | 0.3 | 0.4 | 0.5 | 0.55 | 0.55 | 0.55 | 0.55 | 0.55 | 0.55 |
| | 3 | 0 | 0.35 | 0.5 | 0.6 | 0.7 | 0.8 | 0.8 | 0.8 | 0.8 | 0.8 |
| | 4 | 0 | 0.35 | 0.65 | 0.8 | 0.9 | 1 | 1.05 | 1.1 | 1.1 | 1.1 |
| | 5 | 0 | 0.4 | 0.8 | 1 | 1.1 | 1.2 | 1.3 | 1.4 | 1.4 | 1.4 |
| | 6 | 0.2 | 0.5 | 0.9 | 1.1 | 1.3 | 1.45 | 1.5 | 1.6 | 1.65 | 1.65 |
| | 7 | 0.2 | 0.5 | 0.9 | 1.1 | 1.3 | 1.4 | 1.55 | 1.65 | 1.7 | 1.7 |
| | 8 | 0.2 | 0.5 | 0.9 | 1.1 | 1.35 | 1.5 | 1.6 | 1.65 | 1.7 | 1.7 |
| | 9 | 0.2 | 0.5 | 0.9 | 1.1 | 1.35 | 1.5 | 1.6 | 1.7 | 1.7 | 1.7 |
| | 10 | 0.2 | 0.5 | 0.9 | 1.1 | 1.35 | 1.5 | 1.6 | 1.8 | 1.8 | 1.7 |

|  | Baffle 2 | | | | | | | | | |
|---|---|---|---|---|---|---|---|---|---|---|
|  | 1 | 2 | 3 | 4 | 5 | 6 | 7 | 8 | 9 | 10 |
| 1 | 1050 | 1150 | 1250 | 1300 | 1350 | 1350 | 1350 | 1350 | 1350 | 1350 |
| 2 | 1200 | 1500 | 1600 | 1650 | 1700 | 1750 | 1850 | 1850 | 1850 | 1850 |
| 3 | 1250 | 1650 | 1850 | 1950 | 2050 | 2050 | 2150 | 2150 | 2150 | 2150 |
| 4 | 1400 | 1800 | 2150 | 2300 | 2350 | 2350 | 2350 | 2350 | 2350 | 2350 |
| 5 | 1450 | 2000 | 2250 | 2400 | 2650 | 2750 | 2750 | 2750 | 2750 | 2750 |
| 6 | 1700 | 2250 | 2550 | 2700 | 2850 | 2850 | 3000 | 3100 | 3150 | 3150 |
| 7 | 1500 | 2050 | 2350 | 2550 | 2850 | 2850 | 2950 | 3000 | 3000 | 3000 |
| 8 | 1600 | 2100 | 2400 | 2600 | 2750 | 2850 | 2900 | 3000 | 3000 | 3000 |
| 9 | 1575 | 2050 | 2450 | 2650 | 2750 | 2950 | 2950 | 3050 | 3100 | 3100 |
| 10 | 1575 | 2050 | 2350 | 2600 | 2700 | 2800 | 2950 | 3000 | 3100 | 3100 |

Baffle 1 labels rows 1–10.

Fig. 18

APPARATUS AND METHOD FOR FUEL FLOW RATE, FUEL TEMPERATURE, FUEL DROPLET SIZE, AND BURNER FIRING RATE MODULATION

This application claims priority from U.S. Provisional Application No. 60/753,671 entitled "Apparatus and Method for Fuel Flow Rate, Fuel Temperature, Fuel Droplet Size, and Burner Firing Rate Modulation" filed 22 Dec. 2005, the entire contents of which is incorporated herein by reference.

FIELD OF THE INVENTION

The present invention relates generally to apparatus and methods useful in connection with the combustion of liquid and/or gaseous fuels in a variety of applications. More particularly, the present invention is directed to apparatus and methods that employ "flash heating" fuel management and burner firing rate modulation techniques that provide improved combustion system efficiency, versatility, and robustness. As used herein "flash heating" refers to the utilization of large fuel/heat surface interfaces that allow fuels to be heated quickly and uniformly to predetermined temperature levels.

BACKGROUND

The complexity of the combustion process has lead to contradictory theories concerning how to best improve combustion efficiency and what role fuel temperature plays in combustion system efficiency, versatility, and robustness.

In several patents issued in the field of combustion devices, a function of the device is to cool liquid fuel. For example, U.S. Pat. No. 5,988,265 to Marthaler is directed to a fuel cooling device and states that "[o]ne reason to lower the fuel temperature is to be able to provide a more uniform and consistent fuel temperature which may be desirable in order to control emissions. Another reason is to be able to provide a fuel of lower temperature for more efficient engine operation at high load conditions." Similarly, U.S. Pat. No. 6,428,375 to Takayanagi is directed to a fuel cooling apparatus for an outboard motor. However, cooling of fuel to achieve a uniform and consistent fuel temperature is limited in its application. This is because the ambient conditions of the fuel supply dictate the start temperature of the fuel. Thus, for example, the fuel might start out in a cold condition such as outside during the winter. In addition, latent heat from the combustion source often tends to work against, or to counteract, the affect of external cooling devices thereby reducing the chance for the achievement of efficient fuel cooling. In addition, in those cases in which the fuel is to be cooled below surrounding atmospheric conditions, expensive and high power consuming refrigeration type equipment is required. Further, downsizing refrigeration equipment to a point at which it can be installed in the fuel gun of an oil burning heater is not viable. Consequently, there is a clear need in the art for a device that can efficiently provide a more uniform and consistent fuel temperatures since more uniform and consistent fuel temperatures would be beneficial to the combustion process.

On the other hand, in several other patents issued in the field of combustion devices, a function of the device is to heat liquid fuel. Extensive research and development also has been done in the field of fuel vaporizing devices. As a result, in many of the patents issued in the field of fuel vaporizing devices, the function of the device is to add heat to the liquid fuel in such a manner that the fuel is uniformly and consistently heated to its vaporization temperature. Accordingly, the heating of a fuel in such a manner that the fuel is completely vaporized upon entering an airflow has been indicated as being the key factor in achieving maximum combustion efficiency. For example, U.S. Pat. No. 4,396,372 to Matumoto et al. is directed to a burner system that is adapted to vaporize a liquid fuel such as kerosene at temperatures of 250° to 300° C. Similarly, U.S. Pat. No. 4,465,458 to Nishino et al. is directed to an apparatus for burning liquid fuel that is equipped with a fuel vaporizer that is designed to operate in the range of 200° to 250° C. Further, U.S. Pat. No. 4,483,307 to Gilmor and U.S. Pat. No. 4,475,523 to Goranflo are directed to fuel vaporization devices for use in internal combustion engines. The underlying theory in the art related to fuel vaporizing devices is that a fuel in its vapor or gaseous state burns cleanly. In this regard, it has been theorized that maximum combustion efficiency due to pre-heating the fuel is achieved once 100% of the fuel has been vaporized. Nevertheless, it is well known that hydrogen is a gaseous fuel that burns cleanly. Acetylene, on the other hand, also is a gaseous fuel, but it does not burn cleanly in air. Combustion of the gaseous fuel acetylene in air results in the production of solid carbon in the form of a thick black smoke and soot. Accordingly, it will be recognized that there is a need in the art for a device that correctly identifies and optimizes how fuel temperature affects combustion efficiency and overall appliance efficiency.

When one pound of the carbon contained in a hydrocarbon based fuel is burned to completion, it produces 14,500 BTU of heat. Similarly, when one pound of hydrogen is burned to completion, it also produces a specific amount of heat. Accordingly, the state of the fuel is not a determinative factor in the amount of heat released by the fuel in the combustion reaction. For example, 1 pound of carbon in gaseous propane contains the same amount of energy as one pound of carbon in diesel fuel or even bunker oil. The amount of heat released is based on the mass of carbon and hydrogen burned, not the state of the fuel.

Consequently, since the first law of thermodynamics calls for a conservation of energy, it will be understood that an input of a certain amount of energy to heat a fuel can only result in a maximum increase of that certain amount of energy over and above the amount of energy being released by the combustion reaction itself, assuming that the fuel is burned to completion in both cases. Therefore, an increase in combustion efficiency measured in BTUs released per pound of fuel consumed can only be achieved by increasing the percent of fuel burned and not by changing the state of the fuel burned. As a result, if a burner completely combusts 99% of the fuel flowing through it, only a 1% increase in combustion efficiency is possible. Many constant flow pressure atomization type burners on the market today have combustion efficiencies in the 99% range. Nevertheless, there remains a need in the art for a method capable of modulating the flow rates of these burners without sacrificing the combustion efficiencies thereof (i.e., percent of fuel burned).

Droplet size can also affect the percent of a liquid fuel burned in a particular burner. Accordingly, since a droplet of fuel burns from the outside in, if the droplet is exceedingly large and is moving fast enough, it can leave the region of combustion prior to being completely consumed. Reducing fuel pressure to modulate or reduce fuel flow rates, however, increases droplet size and inhibits complete combustion. Hence, heating a liquid fuel to reduce droplet size can aide in achieving complete combustion, but, heating a liquid fuel to the point of vaporization results in a decrease in system efficiency. This is because once the droplet size necessary to cause complete combustion is achieved, the maximum combustion efficiency also is achieved. Accordingly, any heat energy consumed in the course of doing the work of providing any further droplet size reduction is not regained as an increase in the percent of the fuel burned. Therefore, there is a need in the art for a device and method that maintains the droplet size necessary for complete combustion and does not waste additional energy on unnecessary droplet size reduction. There also is a need in the art for a device and method that maintains proper droplet size at lower fuel pressures. Still further, there is a need in the art for a device and method that allow flow rate modulation in existing constant flow burners without sacrificing combustion efficiency.

In the latter regard, it has been found that the introduction of heat to cause vaporization requires unnecessarily high temperatures that in turn result in apparatus functionality problems. For example, tar is produced at the heat/fuel interface when the temperature of the interface is too high. (See, for example U.S. Pat. No. 4,465,458 [Nishino et al.] which claims the use of a special catalyst with a fuel vaporizer to rectify tar production.). However, as alluded to above, elevated temperatures are needed when the heat/fuel interface surface area is too small and/or the target final fuel temperature is too high. Thus, there is a need in the art for a device that solves the tar production problem associated with fuel heating.

It also is known that maximum combustion efficiency is achieved once complete combustion is achieved. However, the efficiency at which the heat generated from combustion is used to do work depends on many factors. For example, in the case of a heater system designed to heat a house, if the heat exchange that transfers the heat from the combustion process to air flowing into the house is only 50% efficient, then there is the theoretical possibility for a 50% increase in the efficiency of the heat transfer or exchange. Current combustion systems typically used to heat homes and for industrial applications are designed to function at a constant flow rate of fuel. This basic fuel control algorithm has not changed since the 1930's. A thermostat senses when the temperature of the room in which it is located has dropped below a lower set point temperature. When that occurs, the burner ignites and runs at a constant fuel flow rate in all conditions until the temperature of the room in which the thermostat is located reaches its upper set point temperature. Changes in the flow rate of the fuel in the foregoing situation can have a positive effect on the heat transfer and efficiency of the heater system by increasing run times and decreasing the number of light-offs. In addition, increased run times can increase the comfort of heated environments by reducing room temperature fluctuations. Hence, there is a need in the art for a device that can be adapted to existing constant flow burners so as to convert them into modulating burners whereby the heat output of the system can be modulated to react to variations in the demand for heat. For example, variations in the demand for heat can be made dependent upon changes in weather conditions (for example, very cold days require more heat than mildly cold days) or in the most efficient fuel flow control algorithms. (for example, it is often more efficient to have a high initial fuel flow rate to quickly reach thermal stabilization which is then modulated to a lower fuel flow rate to increase burn time.

Conversely, however, in a hot water heater context, it may be more efficient to have a low initial firing rate to react to a low water flow rate such as that encountered when a person washes his hands that switches to a higher flow rate if the lower firing rate is not sufficient). Additionally, there is a need for newly developed burners that are designed for modulated fuel flow rate operation.

New devices are being developed that use fuel pressure changes to modulate fuel flow rates. Exemplary devices of this type utilize pressure ranges from about 100 psi to about 600 psi. In these devices, the burner operates, for example, at a fuel pressure of 600 psi to achieve a flow rate of 0.75 gph. In such a case, the pressure must drop to 100 psi in order to achieve a flow rate of 0.4 gph. These very high-pressure systems have been found to have many inherent problems. For example, if the pressure is elevated, then the fuel exit orifice must be very small in order to maintain the desired small fuel flow rate. However, tiny fuel exit orifices tend to clog. Further, there is no way to predict when the orifice is becoming clogged, so no-heat situations resulting from clogged fuel exit orifices are unavoidable. Additionally, fuel droplet size changes dramatically when the pressure changes from 600 to 100 psi. Finally, high fuel pressures require stronger fuel pumps and better fuel connection sealing techniques to eliminate fuel leaks. The resultant no-heat situations and after-hours service calls resulting from these system weaknesses are a significant and continuing problem for both the customer and the provider in the oil heat industry. Hence, there is a need in the art for a device and method that remotely monitors burner function and predicts system malfunctions thereby allowing for the scheduling of preventative maintenance, rather than unscheduled after-hours service calls due to system failures. Consequently, there is a need in the art for a device and method that can modulate fuel flow rates without resorting to high fuel pressures.

When modulating fuel flow in a burner, it is also necessary to modulate air flow rates to maintain the proper air/fuel mixture ratio so as to achieve efficient combustion. A significant amount of research has been done in the field of air flow and how air flow must be changed when fuel flow is changed in a burner. For example, U.S. Pat. No. 4,464,108 to Korenyi discusses a flame retention head that employs two sets of swirl vanes to increase mixing. Also, U.S. Pat. No. 4,484,887 to Patterson employed shields to affect the air stream. Further, U.S. Pat. No. 6,382,959 to Turk discusses a burner airflow adjustment. Still further, U.S. Pat. No. 5,184,949 to O'Brian discusses airflow adjustment. However, a reduction in fuel flow requires a reduction in airflow such that the proper air fuel mixture ratio is maintained. In some cases, this airflow requirement is below the mechanical limitations of the burner. Further, traditional flame retention head designs rely on a pressure drop across the head to cause the vortex flame shape and proper air fuel mixing, but the low airflows required at fuel flows less than 0.5 gph often result in diminished effectiveness of the flame retention head. Consequently, there is also a need in the art for a device that allows for airflows below the mechanical limitations of traditional burners.

SUMMARY OF THE INVENTION

The apparatus and methods of the present invention employ fuel/heat interface surface areas that are large enough to allow the temperature at the fuel/heat interface to be maintained very near the desired final fuel temperature, thus preventing the possibility of over-heating the fuel, while simultaneously ensuring uniform temperature modulation of substantially all the fuel as it passes quickly through the fuel heating device. This process is referred to herein as "flash heating."

In some cases, the mass and volume of the device is minimized in order to increase the reactivity of the device for better control. More specifically, the desired result of mass reduction is to allow various input levels of electricity to the device to result in stepped increases in fuel temperature substantially immediately upon the input of the electricity. In addition, when electricity is used to maintain a specified fuel temperature, the fuel flow rate can be calculated by monitoring the fuel temperature change and the electricity used to cause that fuel temperature change. The equation used to calculate the fuel flow rate is Flow=Temperature Change*Electricity Used*Specific Heat*Density. Further, a device in accordance with the present invention also may act as a fuel flow meter and thereby provide a means for remote monitoring of the fuel flow rate. For example, if desired, the device can be located at a position substantially removed from the point of combustion in a fuel supply line and be used solely as a flow meter.

In that case, the fuel temperature typically is varied only slightly (e.g. 10 degrees), thereby allowing for the calculation of the fuel flow rate and remote monitoring while not affecting the flow rate at the exit nozzle or the droplet size provided therefrom for combustion. In some cases, the device may be placed in an air stream that will become mixed with the fuel to become an air/fuel mixture. In these cases, some of the heat used to heat the fuel will be lost to the air stream through the outer surface of the device. However, in such cases, the rate of heat loss to the air stream provides a measured indicator of the volume of air flowing in the air stream. The device then allows for simultaneous measurement of the both the fuel flow and the air flow, thereby allowing for monitoring and computer control over the air fuel mixture ratio. The device, therefore, allows for automated correction of mixture ratio deviations and may act as a burner firing rate modulation device. When the device of this invention is used as a burner firing rate modulation device, it is often desirable to operate at firing rates requiring less than 0.5 gallons per hour of fuel flow. When operating in these low fuel flow firing rates, it also is necessary to reduce the air flow so as to maintain the proper air fuel mixture. In some cases, it further is necessary to employ vortex enhancement, excess air blow off techniques (described in detail below) and staged combustion head design, rather than, or in conjunction with, traditional air intake restriction and flame retention head designs.

The "flash heating" fuel management and burner firing rate modulation devices and methods of the present invention include the simultaneous control and/or modulation of fuel flow rates and/or fuel droplet size by the precise control of fuel temperature and pressure. Hence, the method of the invention specifies the fuel temperature and pressure as the determining factors in the relationship among fuel temperature, droplet size, pressure, and flow rate. For example, raising the temperature of the fuel decreases droplet size. Raising the temperature of the fuel also decreases flow rate. However, changing the flow rate of the fuel does not change the temperature of the fuel. Further, in some cases, modulation of the fuel pressure to compound or increase the effect of modulating fuel temperature has been found to be useful. In other cases, it has been found to be useful to hold the fuel temperature at a constant elevated temperature while modulating the fuel pressure. In still other cases, it has been found to be useful to hold the fuel pressure constant while modulating the fuel temperature. In yet other cases, it has been found to be useful to maintain a constant, predetermined droplet size while modulating fuel pressure and temperature.

Thus, it will be readily apparent to those skilled in the art that the devices and methods of the present invention are useful in (1) fuel management devices, (2) burner firing rate management devices, (3) fuel flow meters, and (4) combination management and flow meter apparatus.

More specifically, the present invention provides the desired fuel flow modulation, uniform fuel temperature, droplet size control, tar production elimination, and remote monitoring capability by the provision of devices and methods that utilize "flash heating" fuel management and burner firing rate modulation techniques as mentioned briefly above. "Flash heating" is achieved by increasing the heat/fuel interface surface area to a point at which the temperature of the interface is maintained within a few degrees of the desired final temperature of the fuel. This prevents overheating of the fuel while ensuring uniform temperature modulation of all the fuel passing through the fuel heating device. Specifically, "flash heating" fuel management enables the heat/fuel interface to be maintained within 20 degrees of the desired final fuel temperature. In a specific and exemplary embodiment of the invention, the heat/fuel interface is maintained within 1 degree of the desired final fuel temperature. Thus, the fuel temperature is rapidly and uniformly modulated or "flash heated" while passing through the fuel heating device.

The significance of "flash heating" and what is meant by the term "flash heated" as used herein will be better understood by reference to the following two examples.

EXAMPLE 1

A piece of metal one eighth of an inch in diameter and 200 inches long is to be heated to 250° F. from a starting temperature of 70° F. If a heat source at 250° F. is applied to one end of the metal piece, it would take a very long time for the heat to travel the length of the piece, i.e. for the entire piece of metal to reach the desired temperature. This phenomenon is well illustrated by an example. When tig welding, the filler rod used is about one eighth of an inch in diameter and may be held in your bare hand while welding. This is because the heat applied to the end of the rod is hot enough to melt the rod, but yet that applied heat does not travel quickly up the rod to your bare the hand. However, if that same piece of metal is hammered into a square flat plate measuring 10 inches square, the resulting flat plate is 0.0245 inches thick. In the latter case, when the same 250° F. heat source is applied to the entire surface of one side of the plate, the plate reaches a uniform temperature of 250° F. substantially immediately upon contact with the heat source. This is the basic concept of so-called "flash-heating".

EXAMPLE 2

Oil burning heaters designed for use in homes typically have a one eighth inch ID supply line on the pressure side of the fuel pump. A 2 inch length of such pipe as used in this example is capable of containing 0.0245 cubic inches of fuel. Further, an exemplary flash heater in accordance with present invention used in this example comprises a carbon foam-type material or sintered-type material as the heat/fuel interface. In a prototype of this exemplary device tested at Brookhaven National Laboratories, as described further below, the piece of carbon foam-type material used as the heat/fuel interface was 9/16 inches in diameter and 2 inches long. When the fuel from the 2 inch length of pipe mentioned above was conveyed to the 2 inch long heat/fuel interface, it wicked throughout the entire surface area of the carbon foam material. In this particular example, the carbon foam-type material had approximately 20,000 square inches of surface area for every cubic inch of foam. Hence, the heat/fuel interface surface area of the 2 inch long heat/fuel interface prototype was 9935 square inches in overall interface surface area. When this heat/fuel interface surface area is equated to the square flat plate as described in Example 1 above, it represents a square having a surface area of more than 100 inches per side; and the corresponding layer of fuel to be heated takes the form of a thin film over this heat/fuel interface that is 0.00005 inches thick. Therefore, it will be readily understood by those skilled in the art from the just described exemplary structure that if the heat/fuel interface of that structure is maintained at 250° F., then the fuel film will be uniformly heated to 250° F. substantially immediately upon contact with the surface of the carbon foam material as the fuel flows through the pipe/interface device. The temperature of the fuel film, however, would never exceed the temperature of the heat/fuel interface, e.g. 250° F. Accordingly, it will be understood that accurate fuel temperature modulation (i/e., "flash-heating") can be achieved without the possibility of overheating.

Further, it will be understood by those skilled in the art that it is within the scope of the present invention to employ either sintered type materials or foam type materials as the heated portion of the heat/fuel interface.

Accordingly, when using "flash heating" fuel management techniques (i.e., devices and methods) in lieu of techniques that utilize high fuel pressure changes as discussed above, the same degree of flow rate modulation can be achieved while at the same time addressing the problems associated with high pressure systems. Thus, a typical high pressure system might employ a fuel pressure of 600 psi resulting in a flow rate of 0.75 gph. A comparable "flash heating" fuel management device, on the other hand, would employ a fuel pressure of 100 psi and a fuel temperature of 70° F. (21° C.) degrees, yet result in the same flow rate as the high pressure system, i.e. 0.75 gph. Furthermore, if the pressure in the "flash heating" device were to be dropped to 50 psi, the fuel temperature would be increased to 250° F. (121° C.) degrees and a flow rate of 0.4 gph would result (i.e, a result that is comparable to the expected lower fuel flow rates in high pressure systems). In addition, the mean fuel droplet size in a burner using the "flash heating" fuel management technique just described would be maintained at 35 microns in both configurations. On the other hand, droplet size would change dramatically in the comparable high pressure system when the pressures are changed in the manner just described.

Accordingly, it will be understood by those skilled in the art that the lower pressures used in the "flash heating" fuel management technique allow for larger fuel exit orifices which are less likely to clog than those of high pressure systems. Further, the lower fuel temperatures that are usable in "flash heating" fuel management devices and methods to achieve comparable results to typical high pressure systems conserve electricity by avoiding unnecessary reductions in fuel droplet size below the size at which complete combustion is achieved. Still further, these lower fuel temperatures also prevent the tar production that is prevalent in the high fuel pressure systems currently in use.

Additionally, as already mentioned, since electricity typically is used to heat the fuel, the flow rate of the fuel can be calculated based on the amount of electricity used to heat the fuel. Accordingly, the device may act as a fuel flow meter and allow the remote monitoring of the fuel flow rate. This feature of the present invention is important because a steady drop in flow rate is an indication that the exit orifice or a fuel filter is becoming clogged and service is needed. Accordingly, the capability of "flash heating" fuel management techniques allowing for remote monitoring and trouble shooting permits preventative maintenance to be accurately scheduled and no-heat situations to be avoided. Also, when fuel flow rates are remotely monitored, a running total of fuel burned can be kept and the level of the fuel tank can be estimated. Therefore, fuel deliveries can be better scheduled, and no-heat situations and/or after-hours service calls that heretofore have been a significant problem for both the customer and the provider in the oil heat industry can be avoided.

The "flash heating" fuel management and burner modulation devices and techniques described herein and accomplished by the present invention have been found to provide the following benefits, among others:

1. "Flash heating" fuel management techniques provide a heretofore unavailable additional degree of freedom in the fuel control algorithm, because fuel droplet size can be maintained at a specific maximum mean or modulated along with fuel flow rates. Testing has been performed at the Brookhaven National Laboratory in Upton, N.Y. on a prototype device employing the "flash heating" fuel management techniques of the present invention in the context of an oil burning heater. In this regard, all atomization tests were done using a BNL laser Fraunhofer diffraction spray analyzer. Further, a Delavan 0.6 gph, 70 degree, solid pattern fuel exit nozzle which is commonly utilized in existing constant flow burners was utilized in all of this testing. The results are described below.
    a. The atomization quality (as measured by mean fuel droplet size and fuel droplet size distribution leaving the exit nozzle) at 50 psi and "flash heated" to 250° F. was very similar to the atomization quality (mean fuel droplet size and fuel droplet size distribution) at 100 psi and with no "flash heating". More specifically, the mean droplet size was determined to be on the order of about 35 microns.
    b. Atomization quality at 50 psi of a typical high-pressure fuel delivery system in the absence of "flash heating" was significantly reduced (i.e., the pressure drop resulted in larger droplets) as compared to the atomization quality of 100 psi in the absence of "flash heating".
    c. A fuel flow of 0.64 gph at 100 psi with no heating was modulated to 0.35 gph at 50 psi with "flash heating" to 250° F. while maintaining the desired mean droplet size of 35 microns.
    d. Mean fuel droplet size was significantly reduced when fuel pressure was maintained at 100 psi and the fuel was "flash heated" to 2500° F.
    e. Mean droplet size dropped below 10 microns (i.e, the fuel assumed a vapor state when leaving the exit nozzle) at a fuel temperature of 482° F.
    f. At constant fuel pressure, droplet size was determined to be inversely proportional to fuel temperature.
    g. At constant fuel temperature, droplet size was determined to be inversely proportional to fuel pressure.
    h. Modulating both temperature and pressure allowed for a greater rate of change of fuel flow rate and fuel droplet size than the modulation of either of those parameters alone in a "flash heated" system.
2. The heat energy used to modulate the fuel flow rate was determined to be passed into the combustion process by the fuel in the "flash heated" system.
3. A very high degree of atomization was determined to be possible at very low fuel pressures in the "flash heated" system even when using thicker fuels such as fuel oil. In this regard it is to be noted that standard fuel oil constant flow pressure atomization configurations must operate at fuel pressures of 100 psi or more to produce a mean droplet size of 35 microns. However, it has been determined that operating fuel pressures can be set as low as 5 psi while maintaining mean drop size of 10 microns when using "flash heating" fuel management techniques.
4. "Flash heating" fuel management techniques increase the versatility of a constant flow burner by allowing it to operate at various fuel pressures and flow rates which are lower than is conventionally possible.
5. "Flash heating" fuel management techniques often require only minor modifications to existing burners, thereby making retrofit kits economically viable.
6. Flow rate control in the present invention is achieved with no moving parts, thereby reducing the chance of a mechanical failure. Specifically, fuel flow rate in the present invention is modulated through temperature regulation of a specifically designated heat/fuel interface. Traditional fuel rate modulating devices such as fuel injectors in automobiles, on the other hand, employ solenoids that start and stop the flow of fuel. Fuel flow rate in such cases, therefore, is modulated by changes in the frequency and duration of the open and closed positions of the solenoids. Further, fuel injectors are complicated and expensive and require complex control mechanisms for triggering the solenoids many times per second. Further, other fuel modulating devices use only pressure changes to modulate the fuel flow rate. As a result, fuel droplet size is changed when flow rate is changed in the latter devices.
7. Fuel droplet size can be matched to particular system needs in "flash heated" systems. For example, a droplet size of 35 microns may be best for a burner, but a droplet size of 15 microns may be best for an internal combustion engine.
8. Fuel exit speeds and flow patterns can be optimized through measured modulation of the fuel temperature in "flash heated" systems. This results in better mixing and more complete combustion.
9. The operating characteristics of an entire system can be optimized through "flash heating" fuel management techniques. For example a heat exchanger that heats the air flowing into a house may work best at different BTU flow rates under different heat output requirements. "Flash heating" fuel management techniques allow the symbiotic relationship between the heat exchanger characteristics and the burner fuel flow rate to be optimized as operating conditions change.
10. If a "flash heating" device in accordance with the present invention fails to function due to an electrical component failure, the device acts as a fuel filter, and the fuel delivery system continues to function in the pressure atomization configuration until repairs can be scheduled and completed.
11. In "flash heated" systems, if the fuel flow stops because of a fuel exit orifice malfunction, the fuel trapped at the heat/fuel interface will not overheat because the heat/fuel interface is maintained constantly at the desired final fuel temperature.
12. "Flash heating" fuel management techniques enable and facilitate the remote monitoring of fuel flow rates. In particular, measuring the electricity consumed and the temperature change of the fuel facilitates the calculation of the fuel flow rate by using the following equation:

Fuel Flow=Kilowatts used to heat fuel/((Density of fuel)*(Specific Heat of Fuel)*(Temperature Rise of Fuel))

13. In some cases, a "flash heating" device in accordance with the present invention can be placed in the airflow that ultimately will become part of the air fuel mixture. In these cases, some of the heat used to heat the fuel will be lost to the surrounding atmosphere through the outer surface of the device. However, this rate of heat loss from the air flow is an indication of the rate of air flow and it has been found that this parameter can be used to enable computer control of the air/fuel mixture ratio.

In addition, as described below, there are three different ways in which "flash heating" fuel management techniques can be adapted to existing constant flow combustion systems, or in which "flash heating" fuel management techniques can be used in the design of new burners for modulating fuel flow rate operation, namely:

1. "flash heating" fuel management techniques may be incorporated into or form an in-line fuel flow meter that provides a capability for remote monitoring of the fuel flow rate and also may be used to predict problems in system functionality and future system failure time frames;
2. "Flash heating" fuel management techniques can be incorporated into fuel flow rate and droplet size modulators; and
3. "Flash heating" fuel management techniques can be incorporated into a combination modulating device and flow meter.

As will be described in further detail below, one preferred embodiment of a combustion system in accordance with the present invention includes a base constant fuel flow rate value, a base constant fuel pressure value, a base resultant mean droplet size value, and a base atmospheric fuel temperature value. Therefore, "flash heating" fuel management techniques (i.e., devices and methods) in accordance with the present invention are suitable for retrofit into existing combustion systems for modulation of the fuel pressure, fuel temperature, and mean droplet size therein in a manner that allows for the maintaining the original constant flow type fuel exit nozzle unchanged. Additionally, a retrofit of an existing combustion system utilizing "flash heating" fuel management techniques in accordance with this invention typically allows for the remote monitoring of the fuel flow such that fuel storage tank refill intervals can be optimized and fuel system failures can be predicted, thereby allowing for preventative maintenance rather than system failure.

Therefore, in one aspect, the present invention is directed to an apparatus for increasing system efficiency and versatility that "flash heats" a flow of fuel to a specific temperature that corresponds to a specific fuel pressure prior to the mixture of that fuel flow with a flow of air in a manner such that the fuel flow rate is modulated to a specific desired flow rate and the air flow is modulated so as to maintain the proper air/fuel mixture ratio during burner firing rate modulation.

It further will be understood by those skilled in the art that it is within the scope of this invention to employ a mechanical linkage or computer controlled stepper motors, solenoids, or similar devices as a means for adjusting fuel pressure and air baffle angles so as to maintain proper air/fuel mixture ratios. It will also be understood by those skilled in the art that it is within the scope of this invention to employ two or more stepped burner firing rates, such as a high and low, or a continuous adjustment between a maximum high and minimum low.

In yet another aspect of the present invention, air enters a combination apparatus through an air intake tube and fuel enters the apparatus through a fuel intake tube. The fuel may be in either liquid or gaseous form, or a combination thereof. The fuel intake tube is connected to a fuel modulating device such that the fuel passes through the modulating device and is "flash heated" such that the fuel temperature is raised to a specified uniform and constant temperature while passing through the device. This increase in fuel temperature causes the fuel to expand predictably and also affects the viscosity of the fuel in a predictable way. Accordingly, the result is a reduction in fuel flow rate by a predictable amount prior to the entry of the fuel into the combustion chamber of the combination apparatus. Furthermore, precise modulation of the fuel flow rate through the fuel intake tube is possible, and precise calculation of the fuel flow rate is possible by remotely monitoring the temperature change of the fuel and the amount of energy used to heat the fuel as well as controlling the system according to the above-mentioned mathematical relationship. Also, heat losses through the outer casing of the fuel heating device to the surrounding atmosphere allow the air flow rate to be precisely calculated, and automated airflow adjustments to be made to match the fuel flow, thereby resulting in a desired air/fuel mixture.

The two intake streams (i.e., the fuel flow and the air flow) preferably are then mixed to form a fuel/air mixture that is caused to enter the combustion chamber of the combustion apparatus. Preferably, combustion begins instantaneously upon the initial contact between the fuel and air flows upon their entrance into the combustion chamber. After combustion is initiated, the remaining components of the fuel/air mixture combust while flowing through the combustion chamber or in open air.

It further will be understood by those skilled in the art that the present invention may be used in combustion systems adapted to burn liquid or gaseous fuels or a combination of both liquid and gaseous fuels. "Flash heating" the fuel at a constant pressure reduces the fuel flow rate as compared to the unheated flow rate thereby causing a modulation of the fuel flow rate. This is because the fuel flow rate is inversely proportional to the fuel temperature.

In addition, reducing the fuel pressure further reduces the fuel flow rate. Consequently, a desired mean droplet size can be maintained at the output of a specified fuel exit nozzle at any fuel flow rate or fuel pressure.

In still another aspect, the invention comprises a method for increasing combustion system efficiency and versatility, particularly when the system is used for a variety of variable combustion applications. This method includes the steps of: (a) preheating the fuel to a desired initial fuel temperature for smokeless light-off. (b) allowing a high initial burner firing rate (heat energy release per unit time rate) to rapidly reach thermal stabilization of the entirety of the combustion device; (c) after thermal stabilization, reducing the firing rate (reduced heat energy release per unit time rate) to increase burn time; and (d) precisely modulating the air flow when employing "flash heating" so that the desired optimal air/fuel mixture ratio is maintained.

In yet another aspect, the invention comprises a method for increasing combustion system efficiency and versatility, particularly when the system is used for a variety of variable combustion applications. This method includes the steps of: (a) preheating the fuel to a desired initial fuel temperature for smokeless light-off. (b) allowing a low initial burner firing rate (heat energy release per unit time rate) in response to a low demand for heat such as that caused by a demand for heated water during the course of washing one's hands; (c) modulating the initial burner firing rate to a high firing rate (increased heat energy release per unit time rate) in response to a higher demand for heat such as that caused by a demand for hot water to simultaneously washing one's hands, cloths, and dishes; and (d) precisely modulating the air flow when employing "flash heating" so that the desired optimal air/fuel mixture ratio is maintained.

The invention also contemplates a fuel combustion apparatus comprising an inlet for a stream of liquid or gaseous fuel and/or a combination of both liquid and gaseous fuel; an inlet for a stream of air; and means for adding energy to the stream of fuel thus heating it.

The means for heating the stream of fuel comprises a housing providing mechanical positioning of, and thermal conduction between, a fuel/heat interface and a heat source. The heat source in a representative embodiment includes one or more electric heaters constructed in association with a burner such that latent heat from combustion assists in the heating of the fuel. In this regard as well it will be understood by those skilled in the art that the mating surfaces between the housing that provide the mechanical positioning of the heat source and the heat/fuel interface material may be threaded or otherwise textured to increase the mating surface area and thereby increase the rate of heat transfer.

Finally, in some cases the air flow rate necessary to create the desired air/fuel mixture ratio is below the mechanical limitations of the burner. In such cases, it is contemplated that excess air blow off and/or vortex enhancement techniques will be employed to maintain proper mixing and combustion of the air/fuel mixture.

BRIEF DESCRIPTION OF THE FIGURES

FIG. 18 depicts the airflows measured in SCFH that correspond to the pressures shown in FIG. 17.

DETAILED DESCRIPTION OF PREFERRED EMBODIMENTS

Figure 1:
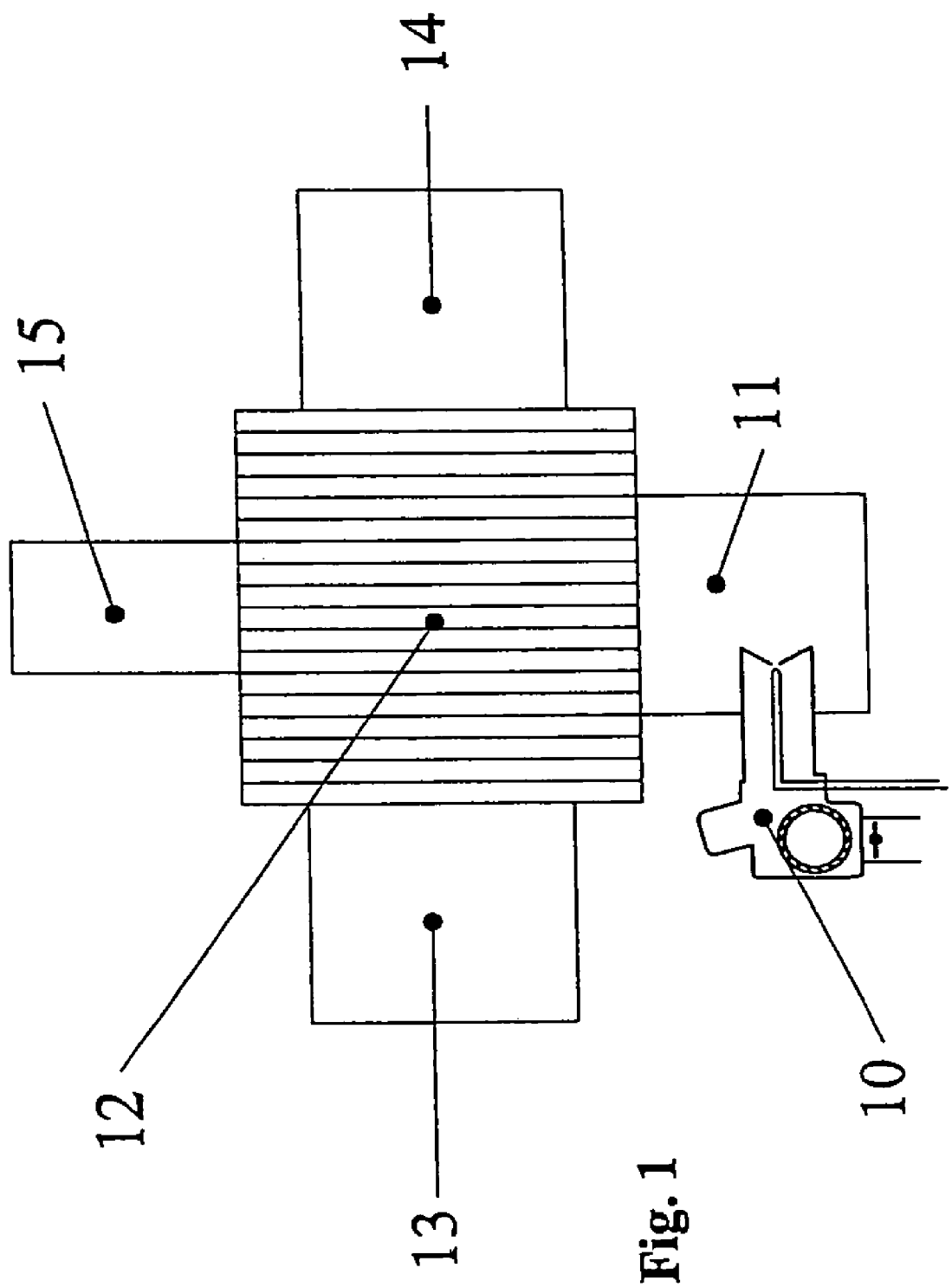
FIG. 1 is a illustrative depiction of an exemplary oil burning home heating combustion system

The present invention is directed to apparatuses and methods for modulating and/or monitoring fuel flow rates and burner firing rates. The efficiency of a combustion system used to provide heat for a home or other structure can be optimized by modulating the burner firing rate to match changing heating demands brought on by changing weather conditions. "Flash heating" fuel management and burner firing rate modulation methods have been found to be particularly novel and useful methods for the accomplishment of these goals. Although combustion systems used to heat structures are detailed in this description of a representative preferred embodiment of the present invention, it will be understood by those of ordinary skill in the art that other combustions systems that employ fuel burners could be adapted to utilize the present invention as well.

A combustion system is a system used to convert the energy from combustion into work. For example, a combustion system designed to heat a house might include a burner for combusting the fuel, an appliance for causing the heat from the combustion to heat the air in the house, and a chimney for carrying the exhaust to the outside of the house. Similar systems may be applied to various environments and utilize various types of burners, such as kerosene or propane heaters for example. Furthermore, conventional systems of the types just mentioned are generally adaptable in design thereby making it possible to apply the principles of the present invention thereto. Hence, the present invention has been found to improve system efficiency as well as the versatility of existing combustion devices that have strict design-modification constraints (referred to herein as "host devices") as well as in the design of new combustion devices that leverage the combustion methodology described herein.

The term "efficiency," as used herein, means the quantity of energy that is converted to do work per unit of fuel consumed. The work in this context can be in the form of heat or mechanical work. In the exemplary tests described below the work was the heating of a flow of air passing through a tube. More specifically, the flame was located in a stationary configuration (i.e., a configuration in which the flame is stationary and an air/fuel mixture flows into, and propagates through, the flame), and the work done by the system was calculated by measuring the volume of air passing through the tube as well as the rise in the temperature of the air passing through the tube caused by the input of heat energy from combustion. In this regard, the standard equation Energy=Density*Specific Heat*Flow*Temperature Rise was used to calculate the specific amount of energy necessary to cause the measured temperature rise of the air flow. In this regard as well, it will be recognized by those of ordinary skill in the art that stationary flame configurations include, but are not limited to, torches, heaters, ovens, furnaces, and boilers. Further, examples of typical fuels used in stationary flame configurations include, but are not limited to, acetylene, propane, natural gas, kerosene, biodiesel and fuel oil.

The term "host device", as used herein, is a device with predetermined design constraints that may be modified to include a "flash heating" fuel management apparatus while maintaining its predetermined design constraints. These design constraints generally depend on the needs and/or desires of the original equipment manufacturer of the host device. For instance, in view of the high cost of originally tooling an assembly line and making subsequent casting changes, the original equipment manufacturer of the burner might specify that the main housing casting for a particular oil burning heater must remain unchanged. Additionally, the original equipment manufacturers may specify that the fuel pump, fuel pressure, fuel exit nozzle, ignition system, fan, fan motor, butterfly valve, air tube, air exit baffle, and air exit tube among other parts all cannot be changed. In one embodiment of the present invention, however, the apparatus is designed for use with, and is attached to or integrated with, a host device such that improved system efficiency and versatility is achieved despite predetermined design constraints.

When the invention is integrated into a pre-existing fuel management system of a combustion system, it can be used to enhance fuel flow modulation as well as system monitoring methods. In this regard, the placement of at least a portion of the apparatus of the present invention upstream of the fuel exit nozzle is preferred in some cases. This is because if the "flash heating" device fails to function due to an electrical component failure or the like, that device will continue to operate as a simple fuel filter, and the fuel delivery system will continue to function in the pressure atomization configuration present prior to any modification. On the other hand, if the "flash heating" device were to be placed downstream relative to the fuel exit nozzle and there was an electrical failure, the system would loose its ability to function in the pressure atomization configuration. Also, if the "flash heating" device is placed downstream relative to the fuel exit nozzle, the fuel continues to spray out of the "flash heating" device after the burner is turned off. The amount of fuel that would spray out in such a case would be proportional to the size of the "flash heating" device. Finally, too much separation between the "flash heating" device and fuel exit nozzle may cause vapor lock. Thus, while the point at which vapor lock occurs depends on fuel temperature and pressure, the problems associated with vapor lock, nevertheless may be prevented or ameliorated in a preferred embodiment of the present invention by locating the "flash heating" device close to the fuel exit nozzle or constructing the elements of the system as a single unit.

FIG. 1 is an illustrative depiction of an exemplary oil burning home heating combustion system that may act as a host device to be modified by the addition of devices that allow it to take advantage of the "flash heating" fuel management techniques of the present invention without changing its predetermined design constraints. Thus, an exemplary burner 10 (shown in detail in FIG. 2) is mounted in a combustion chamber 11 such that the flame produced by the burner occurs inside the combustion chamber. The heated exhaust gases produced by the combustion process move out of the combustion chamber 11 and into the heat exchanger 12. Concurrently, air from inside the house is ducted to the heat exchanger 12 by way of a duct entrance 13. The heat exchanger 12 is designed such that the air from the inside of the house passes through the heat exchanger 12 while remaining mechanically separated from, but in thermal contact with, the heated exhaust gasses. As the air from the inside of the house passes through the heat exchanger 12, it absorbs heat and thereafter is ducted back into the house through the exit duct 14. Then, the cooled exhaust gasses are ducted away from the house through a chimney duct 15.

Those of ordinary skill in the art will recognize that the burner 10, combustion chamber 11, and heat exchanger 12 are usually located in an uninsulated part of the house such as a basement or crawl space that allows for outside air to be used in the combustion process. As a result, the burner 10, combustion chamber 11, and heat exchanger 12 cool during off cycle periods. Hence, it would not be unusual at the time of the ignition of the fuel, for the burner 10, combustion chamber 11, and heat exchanger 12 to be at a temperature of 60° F. or colder. Consequently, much of the initial heat produced by the combustion process in such a situation is used to heat the burner 10, combustion chamber 11, and heat exchanger 12 until they reach their respective preferred operating temperatures. In exemplary prior art combustion systems, during this warm-up period the fuel generally is not completely combusted and as a result produces smoke, and carbon monoxide. Those skilled in the art will recognize that it may take as long as 5 to 10 minutes for the warm up period to be completed before complete smoke free combustion can occur. As stated above, incomplete combustion represents a low level of combustion efficiency.

Additionally, those skilled in the art will recognize that current exemplary oil burning home heating combustion systems generally are oversized for modern homes. The reasons for this lie in advances in insulation and home construction that have not been adequately reacted to by the manufactures of burners for home heating appliances. As a result, exemplary run or burn times in response to typical thermostats can be three minutes or less. Accordingly, a comparison of the current run times of 3 minutes to the current necessary warm-up periods of 5 to 10 minutes clearly indicates that the house is being heated before the burner can reach optimum operating temperatures.

As a result of the foregoing, complete smoke free combustion often never occurs in the typical home heating context. Those skilled in the art will recognize that maintaining the fuel temperature at 130° F. during the off cycle or non-combustion times can reduce necessary warm up times to 2 minutes, however, the heat used to maintain such elevated fuel temperatures during off cycle periods is lost to the outside of the house.

"Flash heating" fuel management techniques, methods and devices can be applied to the exemplary current host oil-burning home heating combustion systems discussed above as follows: During off cycle times the fuel burner 10, combustion chamber 11, and heat exchanger 12 can be allowed to cool to 60° F. or colder so that heat is not lost to the outside of the house during off-cycle times by trying to maintain elevated off-cycle fuel temperatures. Upon a call for heat, the "flash heating" device is preheated to 130° F. so that upon ignition the fuel is "flash heated" to 130° F. at a fuel pressure of 120 psi thereby creating a fuel flow rate of 0.75 gph and reducing the necessary warm-up time to 2 minutes. After the 2 minute warm-up cycle complete smoke free combustion is occurring and the "flash heating" device temperature is raised to 250° F. and the fuel pressure is reduced to 50 psi, thereby creating a fuel flow rate of 0.3 gph (or lower) and a run or burn time on the order of 15 minutes.

A comparison of the run time to the warm-up time indicates that when applying "flash heating" fuel management techniques, complete combustion may be achieved and sustained during a majority of the burner run time, thereby allowing more efficient and cleaner operation of the exemplary oil burning home heating combustion system to be achieved than that possible using currently preferred constant flow control methods that never reach complete and clean combustion operation. Those of ordinary skill in the art also will recognize that this example pertains to a particular house and home heating system and further that particular warm up times and run times can vary without changing scope of the invention. Those of ordinary skill in the art further will recognize that a new home heating system designed to use "flash heating" fuel management techniques can incorporate smaller combustion chambers and heat exchangers such that warm-up periods may be reduced and run times extended without changing the scope of the present invention.

Figure 2:
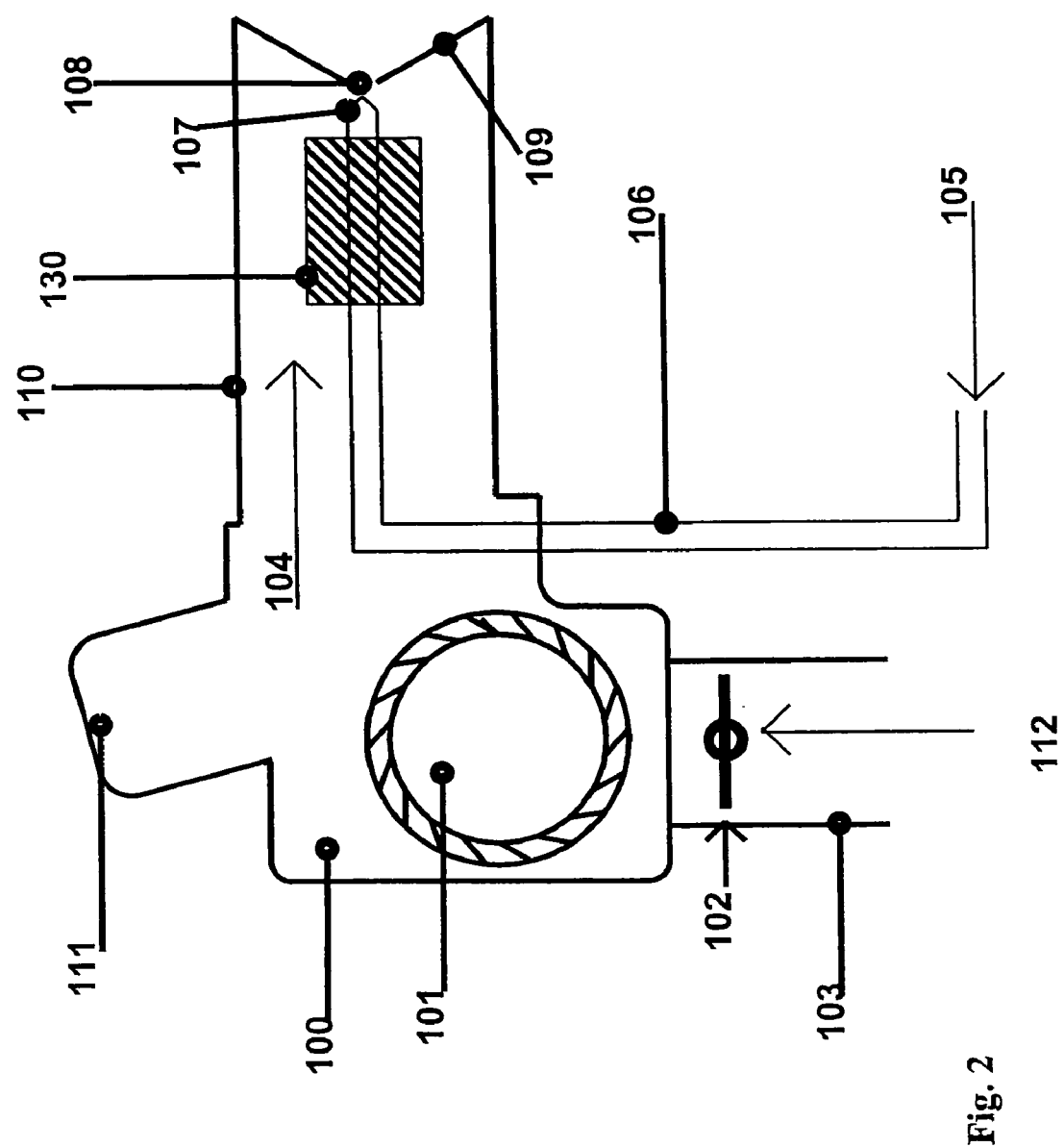
FIG. 2 is a side view in cross-section of an illustrative host burner of an exemplary oil burning home heating combustion system wherein a "flash heating" apparatus in accordance with a preferred embodiment of the present invention has been used to modify fuel flow rate.

A preferred embodiment of the present invention is illustrated in FIG. 2. Specifically, a host burner of an oil burning home heating system modified to include flash fuel heating device 130 of the present invention is provided. The main housing 100 is generally of cast aluminum or stamped steel construction. A fan 101, located inside the main housing 100, which is powered by an electric motor (not shown), is used to draw in outside air that is used to create the required air-fuel mixture. A butterfly valve 102 housed inside an air intake 103 is used to adjust the amount of outside air drawn in by the fan 101. Air flows into the heater in the form of an air intake stream 112 via an air intake 103. After being drawn in by the fan 101, the resulting internal air stream 104 is forced through a predetermined air exit tube 110. Fuel, in the form of a fuel intake stream 105, is pumped into a fuel supply line 106. The fuel is then heated by a flash fuel heating device 130 prior to its being sprayed out of the host fuel exit nozzle 107, whereupon it is mixed with the air 104 and combusted. A spark electrode is positioned at the point 108 is used to initiate combustion. The voltage needed to generate the spark is supplied by transformer 111. An air baffle 109 causes the air stream 104 to exit the air exit tube 110 in a cyclonic flow pattern. The fuel sprayed out of the fuel exit nozzle 107 mixes with the exiting air stream 104 as it combusts, and the resultant flame forms a hollow cylindrical shape at the end of the air exit tube 110. Those of ordinary skill in the art will recognize this as a constant flow flame retention burner configuration with the addition of a "flash heating" capability.

Figure 3:
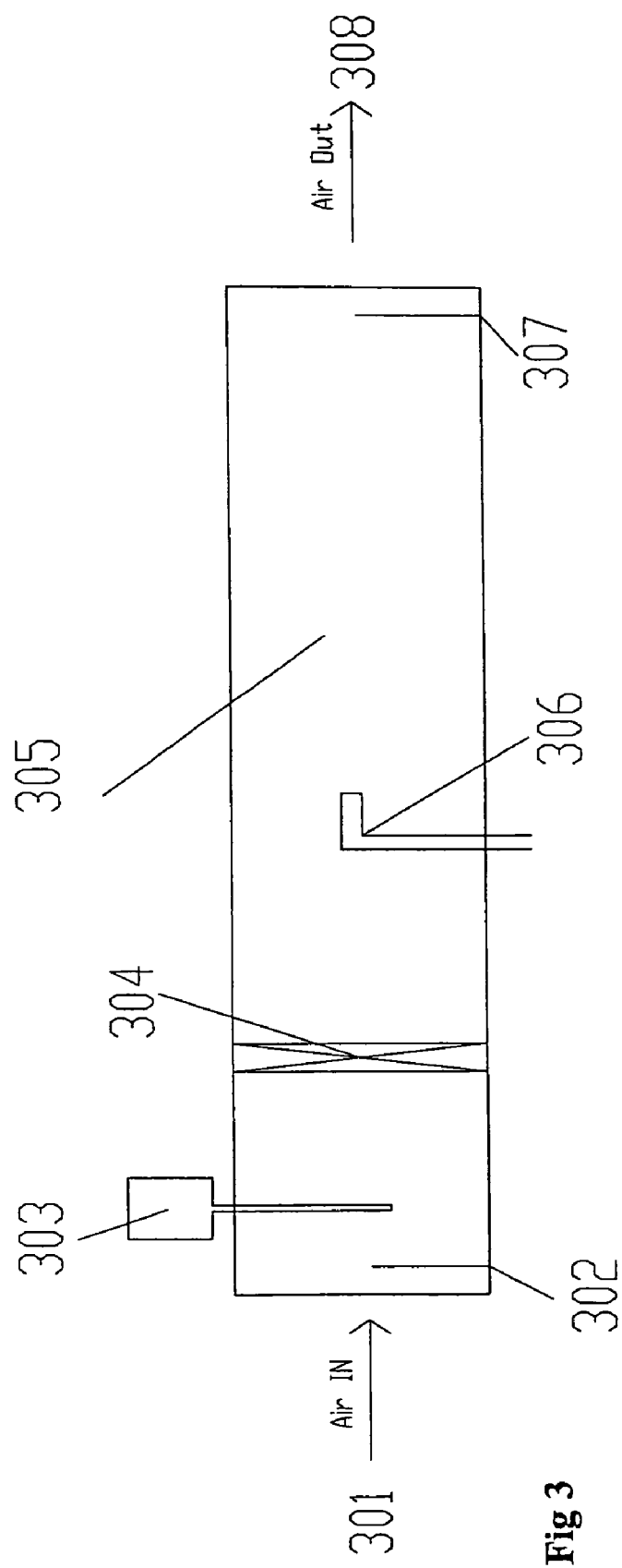
FIG. 3 is an illustrative block diagram of the apparatus used for testing the principles of the present invention in the examples described with regard to FIGS. 4, 5, 6, 7, 8, 9, 10, 11, 12, 13.

FIG. 3 is an illustrative block diagram of the apparatus used for testing the principles of the present invention in the following examples. An insulated tube 305 is placed in a horizontal position on a table. A fan 304 is positioned in the tube 305 such that an air intake flow is created at 301. The temperature of the intake air 301 is measured by a thermocouple 302 positioned in the air intake end of the tube 305. A velocity transducer 303 is also placed in the air intake end of the tube 305 so that the intake airflow 301 can be measured. A fuel exit nozzle 306 is placed at the center of the tube 305 so that the flame is contained with in the tube 305. A thermocouple 307 is placed at the air exit end 308 of the tube 305 so that the temperature rise of the airflow can be measured. It will be understood by those skilled in the art that the fuel exit nozzle 306 and fan 304 may be taken as being representative of an exemplary burner and the thermocouple 302 and velocity transducer 303 may be placed in the air intake of that representative burner. The burner might be positioned at the intake end of the tube 305, if desired. Accordingly, the principles of operation of a variety of combustion devices can be tested with this testing apparatus.

Figure 14:
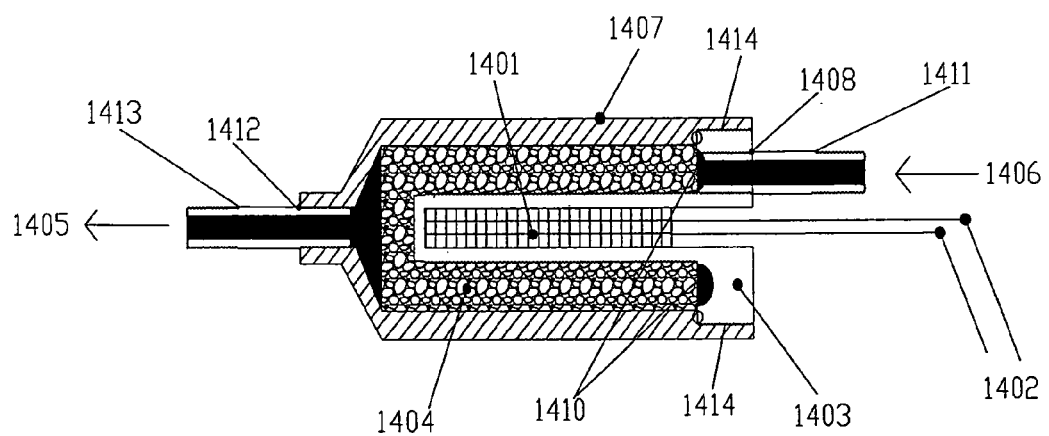
FIG. 14 is an illustrative cross-sectional view of an exemplary embodiment of a "flash heating" device.

FIG. 14 shows a cross sectional view of an exemplary preferred embodiment of a "flash heating" device according to the present invention. In this device, an electric heating element 1401 (detailed by square block type hatch marks in the diagram) is located at the center of the cylindrically shaped device. Electrical power is fed to the heating element 1401 through two wires 1402. The inner housing 1403 (detailed with no hatch markings) includes the area surrounding the heating element 1401 that is in contact with the foam-type material that defines the heat/fuel interface 1404 while an insulating-type material makes up the outer cover 1407. The inner housing 1403 provides the mechanical positioning of, and the thermal conduction between, the heating element 1401 and the heat/fuel interface defining material 1404. The inner housing 1403 also provides mechanical positioning of the outer casing 1407 by threads or some other suitable friction fit generally indicated at 1414. The mechanical positioning of the inner housing 1401 and the heat/fuel interface defining material 1404 includes a threaded or otherwise textured connection to increase surface area of contact and improve the heat transfer characteristics of the device. A fuel entry/exit hole 1408 is provided in the end of the inner housing 1403 such that fuel line 1411 can be connected to the fuel entry/exit hole 1408. Fuel (shown in solid black) enters the device through the nipple 1411 in the direction shown by arrow 1406. The direction of flow through the device is not critical, but for demonstration purposes fuel is shown as flowing from right to left in the diagram. A distribution/collection channel 1410 forms a ring shaped groove that distributes the fuel evenly to the entire end of the cylinder shaped heat/fuel interface defining material 1404.

Hence, in the device depicted in FIG. 14, the fuel travels along and through the heat/fuel interface defined by the surface of the material 1404 and exits through the fuel entry/exit hole 1412 in the direction of arrow 1405. Fuel entry/exit hole 1412 is provided in an end of the outer cover 1407 and a fuel line 1413 can be connected to the fuel entry/exit hole 1412. Further, when the device is used as an in-line flow meter, thermocouples (not shown) can be place in the fuel lines 1413 and 1411 to measure the temperature change of the fuel passing through the "flash heating" device.

On the other hand, when the device depicted in FIG. 14 is used as a fuel modulating device, the fuel line 1413 is replaced by a standard constant flow type fuel exit nozzle. The outer casing 1407 is designed such that a thermocouple (not shown) can be so positioned as to measure the final temperature of the fuel prior to the entry of the fuel into the fuel exit nozzle. The hole 1412 is drilled and tapped to accept the fuel exit nozzle.

In either of the cases just described, a thermocouple also can be positioned in the heat/fuel interface material 1404 to provide communication between the temperature controller and the "flash heating" device.

Heat loss to the outside is minimized when the "flash heating" device is designed with the heating element 1401 at the center of the device. However, it will be recognized by those skilled in the art that the heating element could be placed at the outside of the heat/fuel interface material 1404 without departure from the present invention. In the latter case, the foam or sintered material 1404 would be located at the center of the inner housing 1403 and the heating elements could be embedded in the inner housing. The outer cover 1407 in such an alternative embodiment of the present invention would still provide insulation. In any case, when the device depicted in FIG. 14 is placed in the combustion airflow 104 (see FIG. 2), heat lost to the airflow can be measured. Therefore, a calculated value of the air flow rate can be derived such that the desired air fuel mixture ratio can be maintained.

In the preferred embodiment of the present invention, the heat/fuel interface is a sintered or foam type material. Hence, it will be understood that the heat/fuel interface surface area may be specified as cubic inches of the sintered or foam material times the number of square inches of surface area per cubic inch of material. The cubic inches of heat/fuel interface defined by the material 1404 should be large enough that the temperature of the interface can be maintained at a level near the desired final fuel temperature. A particularly preferred foam material is the High Thermal Conductivity Graphite Foam, first developed at Oak Ridge National Laboratory (ORNL) in 1997 and patented by the U.S. Department of Energy (DOE). This material is characterized by a unique highly crystalline graphitic structure formed into a foam. The basic properties of the foam are: (a) ligament conductivities greater than 1700 W/mK; (b) bulk apparent thermal conductivities greater than 150 W/mK; (c) very high specific surface areas (>20,000 m2/m3); (d) low coefficient of thermal expansion; (e) excellent acoustical adsorption; and (f) excellent electromagnetic shielding. A more complete description of the details of the latter materials is published at www.ms.ornl.gov/researchgroups/cmt/foam/foams.htm.

Figure 15:
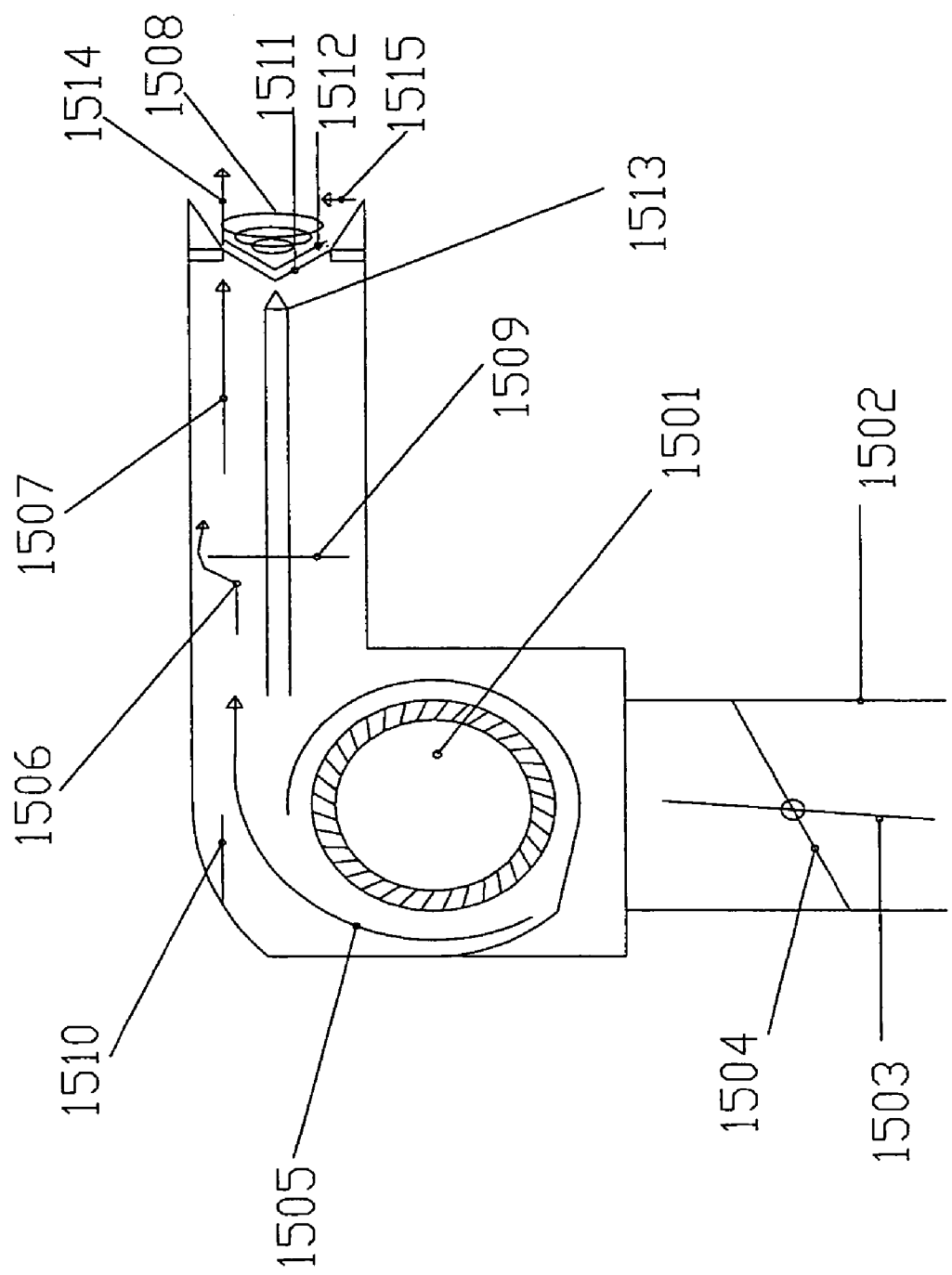
FIG. 15 is an illustrative cross-sectional side view of a host burner of an exemplary oil burning home heating combustion system shown in FIG. 1 including the details of an exemplary flame retention head design and air flow control.

FIG. 15 is a cross-sectional, illustrative side view of an exemplary burner of an oil-burning home heating combustion system. This combustion system may act as a host device for the receipt of, or for modification so as to incorporate, "flash heating" fuel management and burner firing rate devices in accordance with this invention. In addition, FIG. 15 depicts various exemplary air flow control techniques that may be utilized in connection with burner firing rate modulations.

In particular, a squirrel cage fan 1501 draws air into the burner through an air intake 1502. In some cases a butterfly valve 1503 shown in the full open position 1503 and the full closed position 1504 is housed in the air intake 1522. In one specific case, the valve 1503 can be designated as "valve 1" in a 2 valve system. In such a case, rotating the valve from its full open position, representatively shown at 1503, to its full closed position, representatively shown at 1504, restricts the incoming airflow thereby causing a flow rate reduction and a drop in the static pressure produced by the fan 1501. In this case, the airflow 1505 may be further restricted by an adjustable valve 1510 that can be designated as "valve 2" in the two valve system mentioned above. The valve 1510 may be rotated to a full open position or full closed position in a similar manner to the movement of "valve 1". However, valve 1510 restricts the air on the air exit side of the fan while valve 1503 restricts air on the air intake side of the fan 1501.

In other cases, the airflow 1505 may be restricted by a restrictor plate 1509 that restricts the airflow 1505 and can be moved between full open and full closed positions. In a representative case, this is accomplished by moving the restrictor plate 1509 into or out of a funnel shaped baffle 1506. It will be understood by those skilled in the art that an adjustable valve 1510 may achieve the same objective as the restrictor plate 1509 and funnel shaped baffle 1506 in that both alternatives provide an adjustable restriction of the airflow 1505 exiting the squirrel cage fan 1501. In either case, however, the desired result is a flow and static pressure at 1507 that is high enough to cause a vortex flow pattern at 1508.

In addition, exemplary flame retention head designs may incorporate three distinct airflow patterns (or combinations thereof) near the flame in an attempt to cause proper air/fuel mixing and combustion. Thus, an adjustable air cone shown in FIG. 15 has a closed position 1511 and open position 1512 at its center and has slits that induce the vortical flow pattern common to flame retention heads. Movement of the air cone to its open position 1512 causes an airflow 1514 to occur around the outside of the vortical airflow 1508. On the other hand, movement of the air cone to its closed position 1511 reduces the airflow 1514 and increases the percentage of the total airflow made up of vortical airflow 1508. A third airflow 1515 may be directed radically inward and causes increased mixing. Further, it will be seen that all of the airflow adjustments herein discussed involve variations in the restrictions imposed upon the airflow to cause a flow rate control. In addition, flow rate reductions are accompanied by associated drops in static pressure, and the mechanical limitations of airflow adjustment are reached when the vortex flow is diminished and the flame elongates or fails to achieve complete combustion.

Exemplary prior art burners tend to reach their mechanical limitations with respect to airflow rates necessary to match fuel flow rates when fuel flow rates are reduced to about 0.5 gallons per hour. "Flash heating" fuel management techniques, however, have been found to be capable of producing fuel flow rates of under 0.2 gallons per hour. Accordingly, it will be recognized by those skilled in the art from the foregoing discussion that airflow control is important to the control of fuel flow rates.

Hence, in certain cases, it also is beneficial to employ a staged combustion head design in which the air cone is held in a fixed position 1511, thus eliminating the airflow 1514. In this alternative configuration, an additional set of holes (not specifically shown) is provided such that a second airflow similar in direction to the airflow 1515 is created, but is located between the airflow 1515 and the air cone 1511. The results of this are that turbulence is increased closer to the air cone 1511, and that flame elongation is eliminated. Therefore, combustion may be made to occur in stages such that the first stage is located at the air cone 1511, the second stage is located at the first set of holes that create radial flows and the third stage is located at the second set of holes that create the radial airflow 1515.

Figures 16, 17:
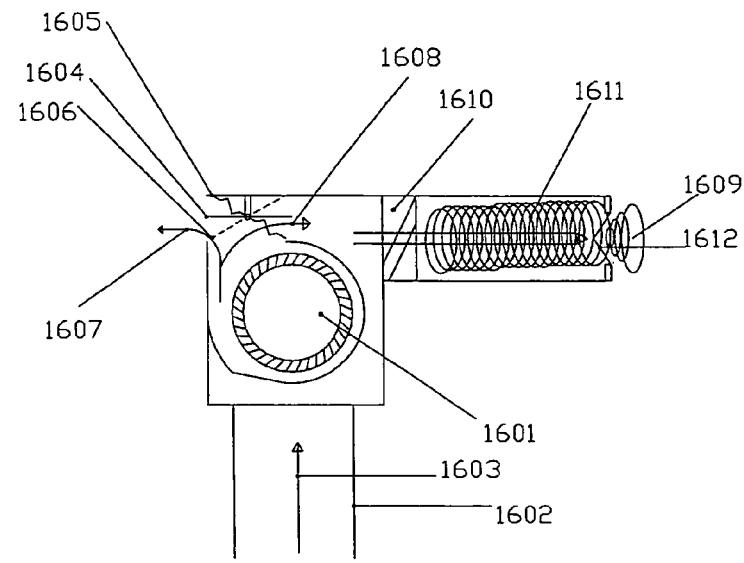
FIG. 16 is an illustrative side view in cross-section of the host burner of exemplary oil burning home heating combustion system shown in FIG. 1 adapted with vortex enhancement and blow by air flow control employed to maintain proper mixing and combustion of air/fuel mixture when the desired flow rate of air is below the mechanical limitations of the host burner or to simplify the construction and control methods herein described.
FIG. 17 is a chart that depicts the static air pressure data collected at various valve positions measured in inches of water column in an air tube positioned directly behind the flame retention head. A dual baffle air modulation mechanism was used in conjunction with fuel flow modulations to maintain air/fuel mixture ratios during burner firing rate modulations.

FIGS. 17 and 18 are charts comparing static air pressure measured in inches of water (FIG. 17) and airflow (FIG. 18) measured in standard cubic feet per minute for the exemplary airflow control methods depicted in FIG. 15. These charts clearly indicate the improved mechanical capabilities of the structures depicted in FIG. 15 mentioned above. Thus, baffle 1 in the charts corresponds to the baffle shown in the open position 1503 in FIG. 15 and in the full closed position 1504. On the other hand, baffle 2 in the charts shown in FIGS. 17 and 18 corresponds to baffle 1510 of FIG. 15. More specifically, in FIGS. 17 and 18, the respective baffle positions are charted from a closed position (representatively shown at 1) to a fully open position (representatively shown at 10).

Therefore, as can be seen from a comparison of FIGS. 17 and 18, at low airflows the static pressure measured at 1507 drops dramatically when the baffles are closed and air flow is restricted. In conventional flame retention heads pressures of 0.5 inches of water or higher are necessary for proper vortex formation. Also, fuel flows of 0.5 gph require flow rates of 1000 SCFH or less and result in pressures below the required 0.5 inches of water. The present invention constitutes an improvement over these limitations of conventional systems.

FIG. 16 depicts the host burner of an exemplary oil burning home heating combustion system as representatively shown in FIGS. 1 and 15 that has been modified to include vortex enhancement and air blow off air flow control technique capabilities employed to maintain proper mixing and combustion of the air/fuel mixture when the desired flow rate of air is below the mechanical limitation of the host burner as described with regard to FIGS. 15, 17 and 18 above. A squirrel cage fan 1601 (comparable to that depicted in FIG. 15 at 1501) draws air into the burner through an air intake 1602 (comparable to that depicted in FIG. 15 at 1502). The air intake 1602 has an unrestricted air entrance path 1603 because there is no butterfly valve in this configuration. A new butterfly valve 1604, shown in the full closed position at 1605 and in the full open position at 1606, deflects a portion of the air flow outside of the burner at airflow 1607 and the balance of the airflow into the burner at airflow 1608. The supply airflow remains at a constant flow rate and static pressure throughout the range of adjustment of the apparatus because a blow-off technique is used to control air flow by deflecting of a portion of the air rather than attempting airflow control by airflow restriction. As discussed above, this allows higher static air supply pressures to be generated at very low airflows contrary to the conventional devices discussed above. The airflow is then ducted at air duct 1610 such that it impinges on the inner surface of the air tube at a steep angle thereby causing it to follow circular flow pattern 1611 as it travels toward the flame retention head 1612. The circular flow pattern 1611 is contemplated to be of a design that enhances the vortex combustion shape 1609 at low air flow rates because it contacts the flame retention head at the desired final flow angle, rather than at the conventional linear flow pattern direction.

In some instances, it is necessary (or desirable) to divide the butterfly valve 1604 into two or more separate valve portions that can act independently of one another. This alternative allows the air flow 1608 to be divided into two or more separated air flows that can be separately ducted such that they independently impart the three distinct flame retention head air flow patterns mentioned above with regard to FIG. 15 to the airflow. For example if the butterfly valve 1604 is constructed as three separate valve portions mounted side by side in the air flow 1608, the air from the three valve portions 1604 may be ducted into the three separate air flow patterns 1508, 1514, 1515. If the first valve 1604 in the row is directed such that its output airflow only impacts the vertical air flow pattern 1508, manipulating the first valve 1604 would only effect the air flow rate in the vertical flow 1508. Similarly, the second baffle 1604 in line could be directed to only effect the airflow 1514. This allows for the tuning of the percentage of the total airflow contained in each of the three airflows 1508, 1514, 1515 by the simple manipulation of the valve portions 1604 to achieve the results superior to the conventional art discussed above.

The present inventor has tested two burners, one with the vortex enhancement and one without, in order to demonstrate the benefits of the vortex enhancement. These tests were conducted in an exemplary air-to-air home heating appliance and all manufacturer guidelines were followed in the set-up of the appliance and in the measurement of the emissions therefrom. In these particular tests, the theoretical minimum air/fuel mixture ratio results in a carbon dioxide measurement in the exhaust of 14%. A carbon dioxide measurement of 11.7% would result in an excess airflow by 5.2%. A burner is considered to be operating most efficient at the minimum air fuel mixture with which it is designed to operate. This is because it is at that point that the highest temperature differential at the heat exchanger is created. Excess air tends to cool the exhaust thereby applying cooler air to the heat exchanger. In practice, the air/fuel mixture ratio is reduced to the point just before the point at which incomplete combustion occurs, that as mentioned above is noticeably evidenced by smoke or carbon monoxide in the exhaust. Further, when comparing a burner with vortex enhancement to a burner without vortex enhancement, it has been found that for a similar fuel flow and fuel temperature a burner with vortex enhancement operates at a $CO_2$ measurement of 13.3%, with 3.2% excess air while producing 0 ppm CO, and a slight trace of smoke. A burner without t vortex enhancement, on the other hand, produces a level of smoke of 1 on the standard smoke scale when at $CO_2$ of 11.7% and excess air of 5.2% are present. Hence, a further reduction in air flow has been found to result in more smoke.

This type testing also exemplifies the scope of the present invention that optimizes the electrical input to heat the fuel by not heating the fuel past the point at which the fuel droplet size results in complete combustion. In other words, when testing a burner with the vortex enhancement, it was found that a $CO_2$ measurement of 13.3% and excess air of 3.2% resulted in a CO measurement of 0 ppm and a slight trace of smoke at a fuel temperature of 105° F. and a fuel pressure of 125 psi. When the fuel was further heated to 300° F. at the same 125 psi, however, a $CO_2$ of 13.2% and excess air of 3.3% resulted in CO of 0 ppm and a slight trace of smoke. Clearly then, there is no additional benefit to heating the fuel beyond a temperature of 105° F. at 125 psi of fuel pressure in this particular case. Consequently, it will be understood by those skilled in the art that the particular temperature and pressure for each particular apparatus set up may vary, but it is within the scope of this invention to arrive at a maximum necessary fuel temperature for a particular fuel pressure that results in a mean droplet size that results in complete combustion.

It also will be recognized that the principles of the above specific embodiments may be applied generally to many different combustion devices and/or environments to improve system efficiency and versatility. For example, those skilled in the art will readily recognize that these principles may be applied to stationary flame combustion devices that burn hydrocarbon fuel, such as kerosene heaters, acetylene burners, propane heaters, and other related stationary flame fuel burners. The present invention also will find utility in applications relating to other kinds of combustion devices as will from time to time be recognized by those skilled in the art.

EXAMPLES

The following examples are indicative of the results that may be achieved by the integration of the present invention into existing constant-flow combustion devices so as to provide for modulation and monitoring of the fuel flow and burner firing rate modulation.

In the examples below the work done was heating a flow of air passing through a tube as generally briefly discussed above. (See FIG. 3) The tube was provided with air flow meters as well as thermocouples and fuel flow meters. In this regard, it is to be understood by those of ordinary skill in the art that the same or similar data can be collected by other well known techniques. It also will be understood by those skilled in the art that the same or similar data can be collected and automatically downloaded to a computer for storage and analysis. The flame was in the stationary configuration (as previously defined herein as a configuration in which a flame is stationary and an air-fuel mixture flows into, and propagates through, the flame) and the work done by the system was calculated by measuring the volume of air passing through the tube and the temperature rise of the air passing through the tube. Heat energy from combustion caused the temperature rise of the air passing through the tube so the standard equation Energy=Density*Specific Heat*Flow*Temperature Rise was used to calculate the amount of energy necessary to cause the temperature rise of the airflow. All of the tests also were performed under constant fuel pressure conditions.

Example 1

Gaseous Acetylene Fuel Flow Modulation Through Flash Heating

In this example the fuel combusted to cause a temperature increase in the air passing through the tube 305 described in FIG. 3 was acetylene. The non-heated fuel flow resulted in a large percentage of unburned fuel being exhausted. Incomplete combustion was indicated by heavy soot and black smoke coming out of the air out end 308 of the tube 305. When the "flash heating" fuel management techniques of this invention were used, however, combustion of the gaseous fuel was positively affected causing a more complete combustion.

This example differentiates the present invention from conventional devices that heat fuel to cause its vaporization because the fuel was in the gaseous state in both the complete and incomplete combustion situations. The underlying theory in the art regarding fuel vaporizing devices is that fuel in a vapor or gaseous state burns clean. Maximum combustion efficiency due to pre-heating the fuel is theorized to be achieved once 100% vaporization is achieved. The foregoing example demonstrates, however, that the state of the fuel is immaterial as a contributing factor in causing complete combustion.

Figure 4:
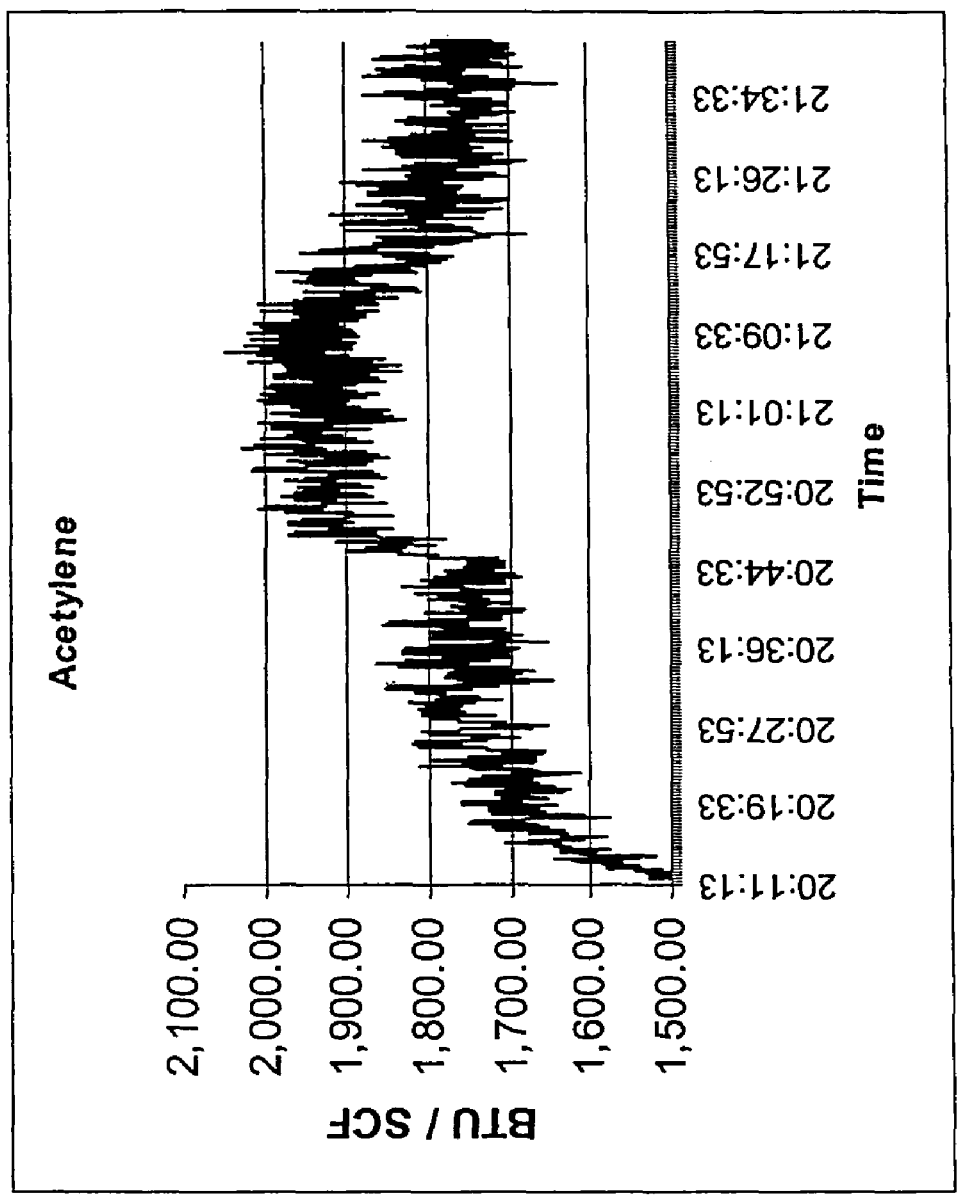
FIG. 4 is a graph of efficiency increase versus time, due to an increase in the percentage of fuel burned, in a test burning gaseous acetylene as described with regard to Example 1.
Figure 5:
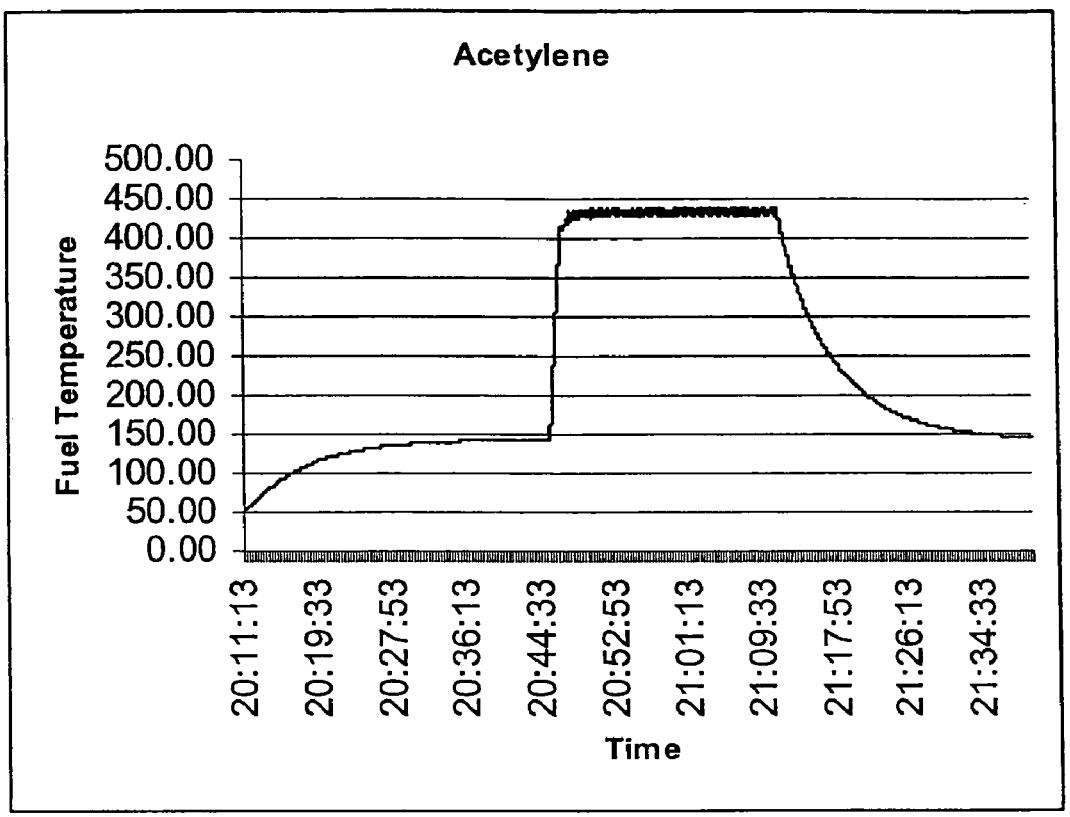
FIG. 5 is a graph of fuel temperature versus time as described with regard to Example 1.

FIG. 4 is a graph of the BTUs of heat produced per SCF (standard cubic foot) of fuel burned verses time. FIG. 5 is a graph of the temperature of "flash heated" fuel verses time. As the temperature of the fuel increased, the heat released per cubic foot of fuel burned increased, thereby indicating more complete combustion. A visual inspection of the air out portion of the testing tube indicated that the increase in heat released was accompanied by a reduction in the amount of black smoke and soot production, thereby further indicating more complete combustion results when the present invention is utilized. Thus, it has been found that at least in some cases, "flash heating" fuel management techniques and devices have the side effect of increasing the percentage of fuel burned. These increases in percentage of fuel burned have been observed in cases involving gaseous as well as liquid fuels Example 2

Liquid Kerosene Fuel Flow Modulation by "Flash Heating"

Figure 6:
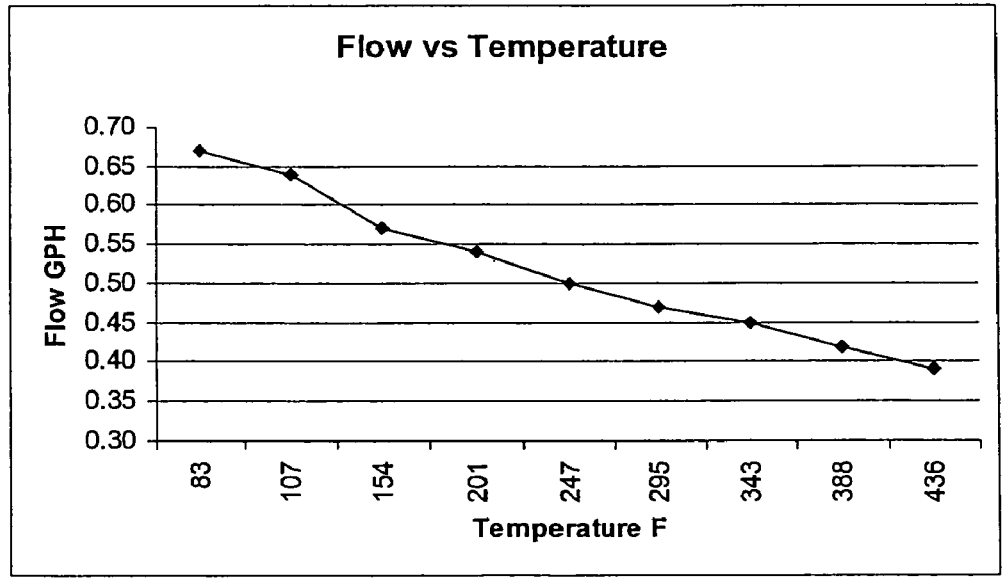
FIG. 6 is a graph of fuel flow rate verses temperature to which the fuel was modulated to at a constant 100 psi fuel pressure for liquid kerosene discussed with regard to Example 2.
Figure 7:
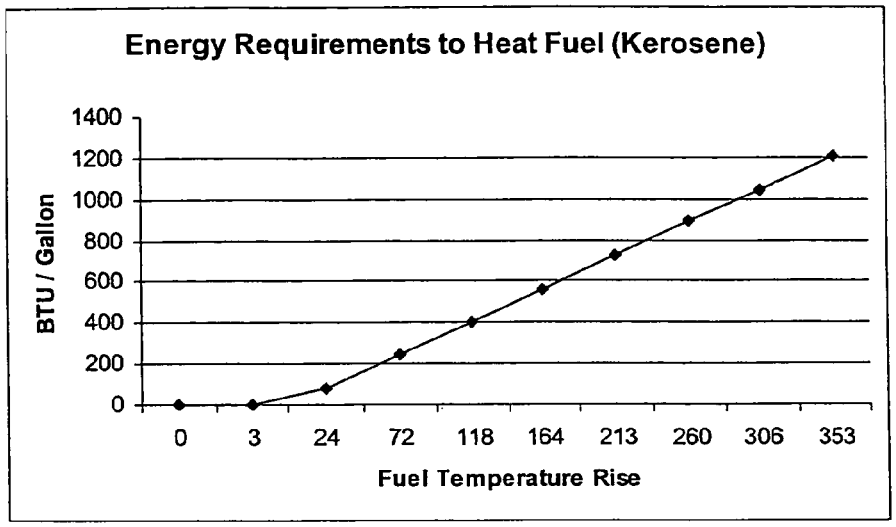
FIG. 7 is a graph showing the energy required to modulate liquid kerosene to various temperatures.

In this example the fuel combusted to cause a temperature increase in the air passing through the tube 305 described in FIG. 3 was kerosene. FIG. 6 shows the relationship between the temperatures to which the fuel was "flash heated" and the resultant fuel flow rates at a constant fuel pressure of 100 psi. FIG. 2 depicts how the "flash heating" modulation method was adapted to a conventional burner. FIG. 7 shows the relationship between the desired temperature rise of the fuel and the energy required to cause the fuel temperature and flow modulation. The electrical requirements can be used in algorithms used for remote monitoring where temperature rise of the fuel and electrical requirements to achieve the temperature rise are used to calculate fuel flow.

Example 3

Liquid Kerosene Fuel Flow Modulation Through "Flash Heating"

Figure 8:
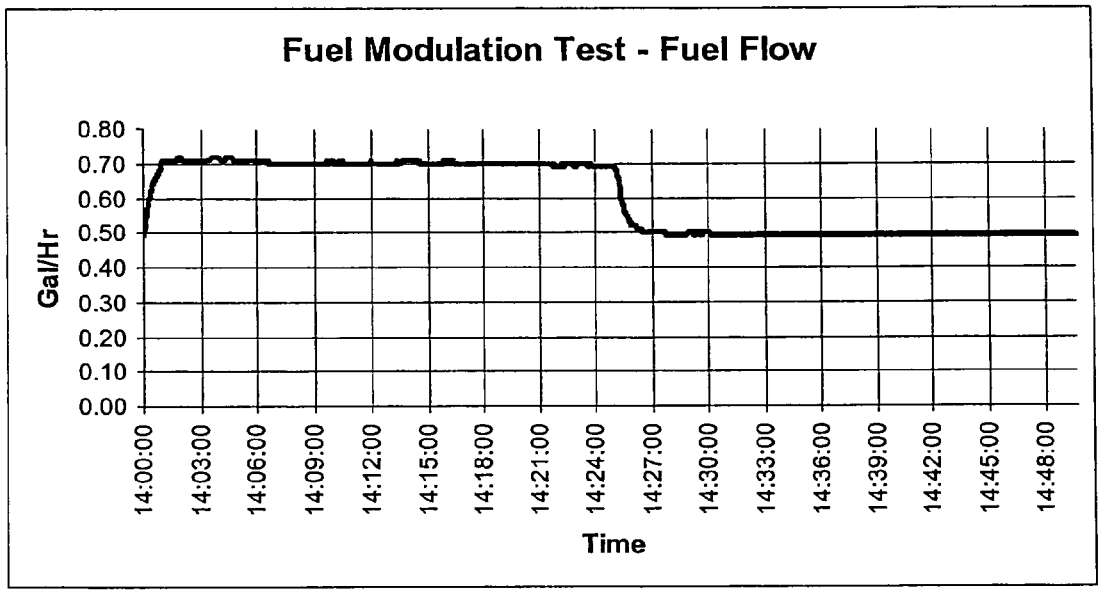
FIG. 8 is a graph of fuel flow versus time for the test discussed with regard to Example 3.
Figure 9:
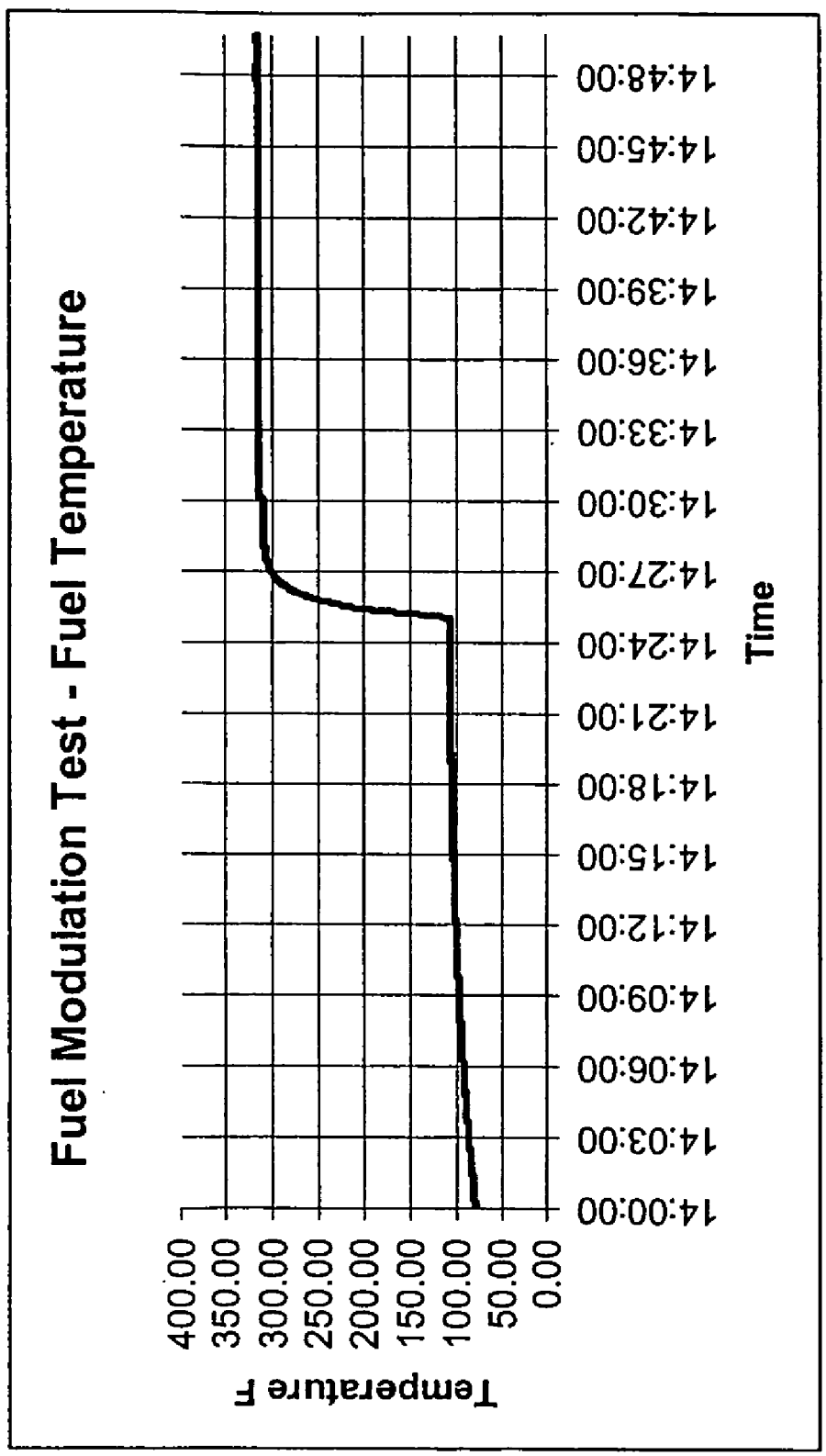
FIG. 9 is a graph of fuel temperature versus time for the test run in Example 3.

This test simulated an operation regime in which the initial fuel flow is high and subsequently, after thermal stabilization, the fuel flow rate is modulated to a lower flow rate. FIG. 8 is a graphical representation of the data collected for fuel flow in gallons of fuel flowed per hour versus time during the test. FIG. 9 is a graphical representation of the temperature to which the fuel was modulated versus time elapsed. The fuel flow rate is shown to modulate when the fuel temperature is modulated. Time 14:30:00 to 14:48:00 in FIG. 9 indicates that the modulated flow rate is very stable.

Example 4

Liquid High Sulfur Diesel Fuel Known as Off Road Diesel Flow Modulation Through "Flash Heating"

Figure 10:
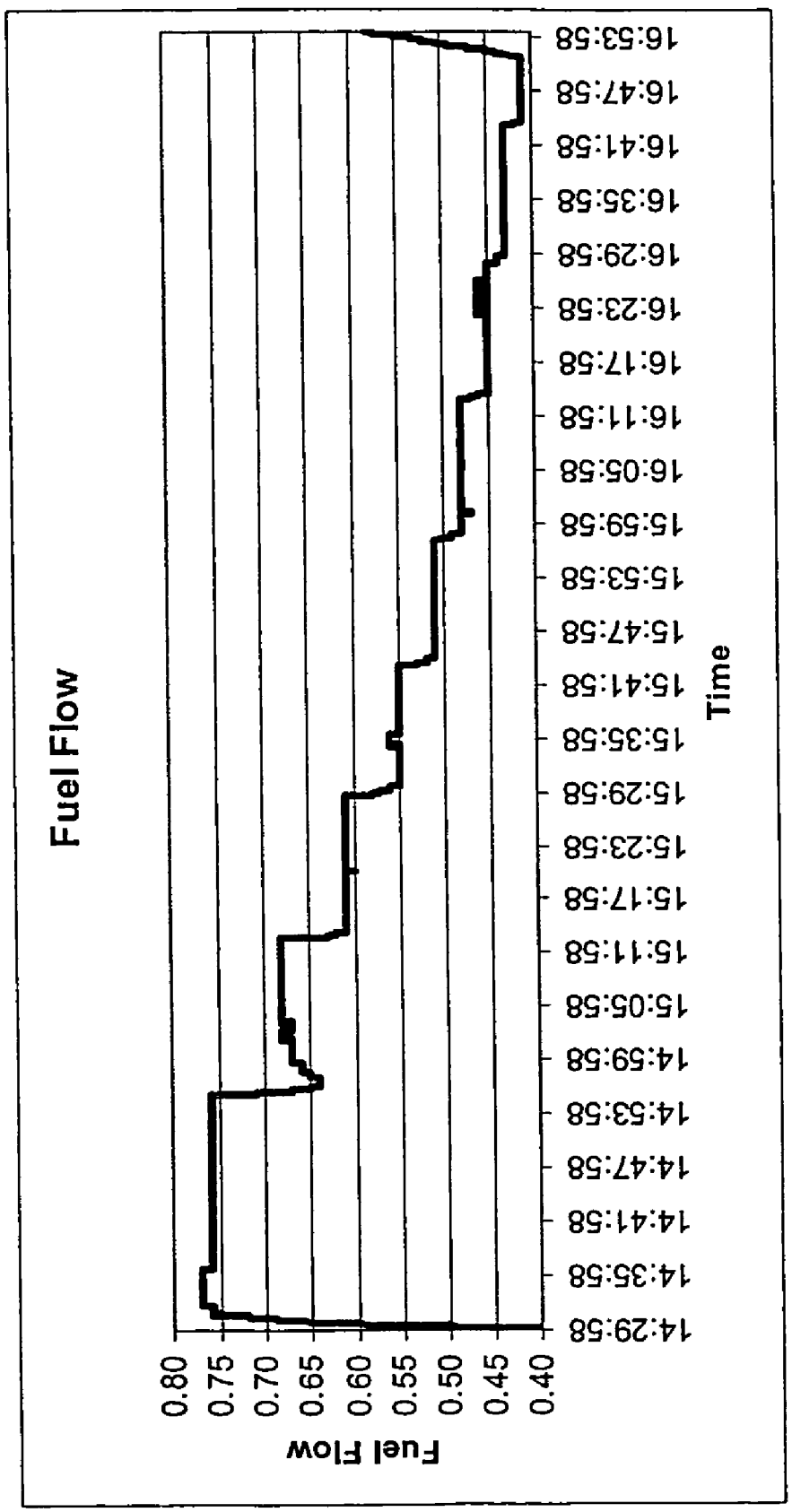
FIG. 10 is a graph of the off-road diesel fuel flow versus time for the test discussed with regard to Example 4.
Figure 11:
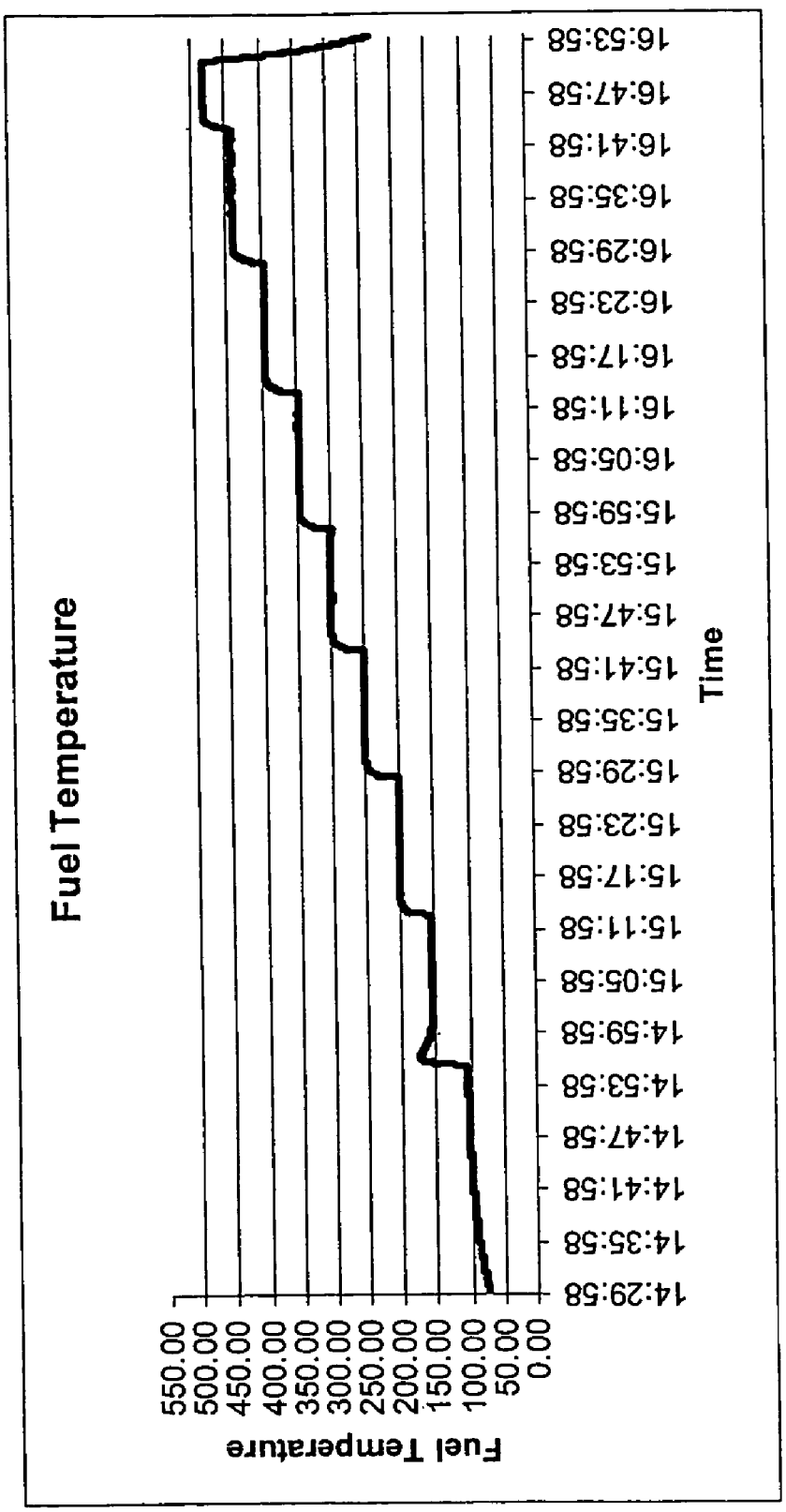
FIG. 11 is a graph of the off-road diesel fuel temperature versus time for the test run discussed with regard to Example 4.

In this example the fuel combusted to cause a temperature increase in the air passing through the tube 305 shown in FIG. 3 was off road diesel fuel. FIG. 10 graphically depicts the fuel flow verses time during the test. FIG. 11 graphically depicts the temperature to which the fuel was modulated verses time during the test. A comparison of the graphs indicates the relationship between the temperatures to which the fuel is "flash heated" and the resultant fuel flow rates. FIG. 2 depicts how the "flash heating" modulation method was adapted to the conventional burner.

Example 5

Gaseous Propane Fuel Flow Modulation Through "Flash Heating"

Figure 12:
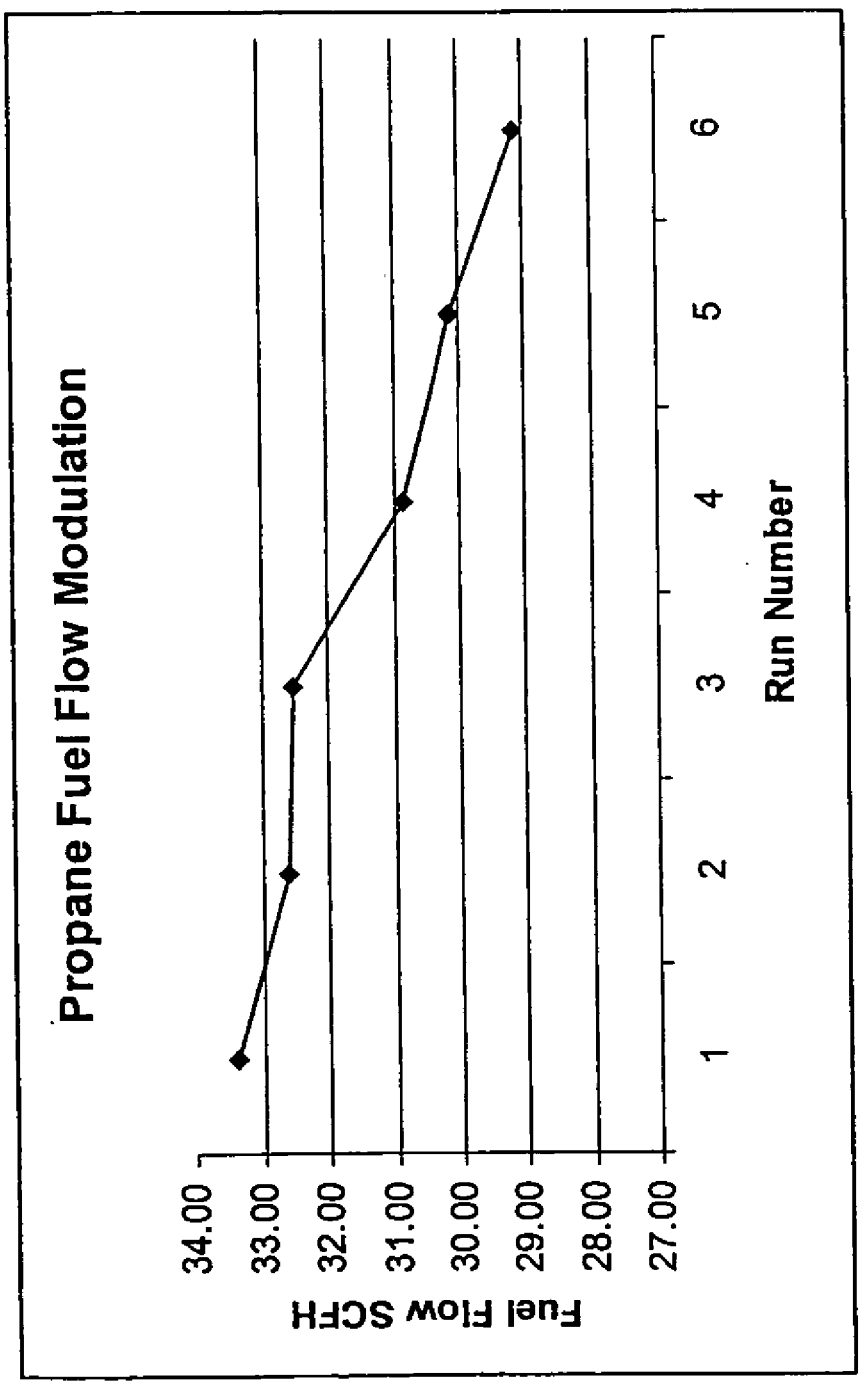
FIG. 12 is a graph of the propane fuel flow versus run number for the tests discussed with regard to Example 5.
Figure 13:
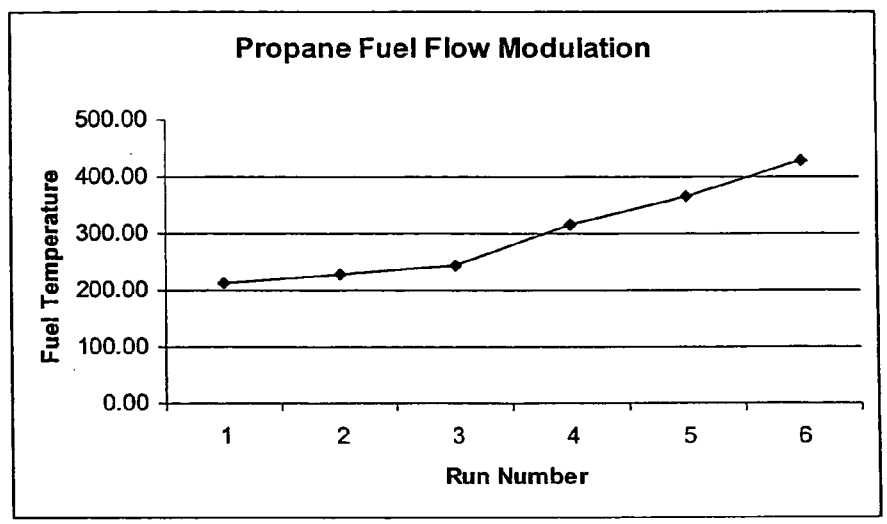
FIG. 13 is a graph of the propane fuel temperature versus run number for the tests discussed with regard to Example 5.

In this example the fuel combusted to cause a temperature increase in the air passing through the tube 305 described in FIG. 3 was propane. FIG. 12 graphically depicts the fuel flow verses run number. FIG. 13 graphically depicts the temperature to which the fuel was modulated verses the run number. A comparison of the graphs is indicative of the relationship between the temperatures to which the fuel is "flash heated" and the resultant fuel flow rates. The constant flow conventional propane-burning heater adapted with the "flash heating" fuel modulation device and method in accordance with the present invention was designed to be a direct replacement for the oil burning heater depicted in FIG. 1.

Therefore, an apparatus constructed or modified in accordance with the principles of the present invention is designed such that the fuel will be "flash heated" so as to cause modulation of the fuel flow rate. Preferably, mathematical and/or computer models may be defined to describe the construction of the device and the algorithms necessary to carry out remote monitoring. These algorithms may be in the form of equations or lookup tables developed to specify the optimum temperature for a particular orifice size, fuel pressure, and desired fuel flow rate.

The fuel exit nozzle typically is within an eighth of an inch of the flame. Hence, heat from the flame radiates back and heats up the fuel exit nozzle, and, therefore the fuel. Accordingly, once the fuel heating requirements are established for a particular configuration, it is contemplated that the device preferably will be designed to extract heat from the flame directly, thereby eliminating any need for electrical heating elements. Additionally, those skilled in the art will readily understand that waste heat or heat traditionally lost to the atmosphere can be rerouted to heat fuel in the context of the present invention as herein described.

It will be appreciated by those skilled in the art that while the invention has been described above in connection with particular embodiments, the invention is not necessarily so limited and that numerous other embodiments, examples, uses, modifications and departures from the embodiments described herein may be made without departing from the inventive concept. Also, each of the references mentioned herein is incorporated by reference in its entirety for all of its teachings and disclosure. It will be appreciated by those skilled in the art that analysis of the data tables incorporated shows that the fuel temperature is inversely proportional to the fuel flow rate. In addition, fuel flow rate modulation is readily achieved through "flash heating" to modulate fuel temperatures.

What is claimed is:

1. A combustion system comprising:
an air/fuel mixing region for forming an air/fuel mixture;
a combustion chamber for receiving via an outlet in said air/fuel mixing region, igniting at preselected intervals and burning said air/fuel mixture formed in said mixing region,
at least one first input means for providing input air to said mixing region,
at least one second input means for providing a fluidic fuel to said mixing region, and
extraction means for transferring heat energy produced by the burning of the air/fuel mixture out of the combustion chamber to perform work;
said at least one second input means including a fuel temperature management device comprising:
an enclosed volume having a first inlet for receiving said fluidic fuel,
a second inlet for receiving and conducting preselected quantities of external energy into the interior of said volume,
an outlet for discharging said fluidic fuel to said mixing region, and
a heat/fuel interface disposed within said volume in energy receiving relation with said external energy,
wherein said heat/fuel interface defines a surface area of a size such that when the heat/fuel interface is maintained at substantially a predetermined temperature by said external energy, fuel flowing into said enclosed volume is quickly, precisely and substantially uniformly heated to said predetermined temperature prior to flowing outwardly of said enclosed volume into said mixing region via said outlet; and
wherein said fuel temperature management device further comprises:
an elongate outer casing centered around a longitudinal axis,
an open rear input end,
a hollow tapered forward output end;
a heat/fuel interface material disposed in said casing, and defining a forward wall portion and side wall portions that together define a closed forward end disposed substantially adjacent to said forward tapered end of said casing, an open rear end spaced forwardly of said open rear end of said casing and a central longitudinal cavity extending from the open rear end of the heat/fuel interface material to said front wall thereof;

an elongate heating element disposed in said longitudinal cavity of said heat/fuel interface material in communication with said input external energy, an exit nozzle communicating with the hollow interior of and extending substantially axially forward from said forward tapered end of said casing, and an input nozzle affixed to a portion of the open rear end of said heat/fuel interface material and a seal disposed on the remainder of said open rear end of said heat/fuel interface material, whereby said fuel temperature management device may be disposed in an input fuel line supplying fuel to said air/fuel mixing region such that input fuel enters said rear end of said heat/fuel interface material and fills voids present between the surfaces thereof while said heating element receives said external energy and heats the heat/fuel interface material surrounding it substantially uniformly and said fuel is thereafter discharged from the forward end portion of the fuel/interface material into said hollow tapered end of said casing and thence into said forwardly extending exit nozzle for transfer to the air/fuel mixing region.

2. The combustion system of claim 1, further comprising modulation means for variably controlling over time a quantity of fuel flowing into said mixing region through said fuel temperature management device.

3. The combustion system of claim 2, wherein said modulating means comprises control means for variably controlling over time a quantity of external energy supplied to said temperature management device.

4. The combustion system of claim 2, wherein said modulating means comprises control means for variably controlling over time an input pressure of said fluidic fuel supplied to said temperature management device.

5. The combustion system of claim 2, wherein when said fluidic fuel is a liquid that is discharged from said second input means in the form of droplets, said modulating means variably controls over time a mean droplet size of the fuel input to said air/fuel mixing region.

6. The combustion system of claim 2, further comprising modulating means for variably controlling over time quantities of air flowing into said mixing region.

7. The combustion system of claim 1, wherein said heat/fuel interface comprises temperature-affecting material that receives said external energy via said second inlet and converts said received external energy to heat such that substantially the entire surface area of said temperature-affecting material is maintained at the same substantially uniform temperature.

8. The combustion system of claim 7, wherein said temperature affecting material is selected from the group consisting of temperature-affecting foam materials including carbon-based foam materials and temperature-affecting sintered materials including sintered metals.

9. The combustion system of claim 1, wherein said external energy is electrical energy.

10. The combustion system of claim 1, wherein said fuel is selected from the group consisting of liquid fuel, gaseous fuel and mixtures of liquid and gaseous fuels.

11. The combustion system of claim 1, further comprising means for externally monitoring at least one of fuel flow rate, input fuel pressure, output fuel pressure, input fuel temperature, output fuel temperature, and input external energy.

12. The combustion system of claim 1 comprising:

means for externally monitoring fuel flow rate, fuel temperature or both is selected from the group consisting of thermistors and thermocouples, respectively associated with an input fluid supply and said outlet.

13. The combustion system of claim 1, wherein said combustion chamber comprises a hollow housing and said extraction means comprises heat exchange means disposed in a wall of said housing for transferring heat energy generated by said burning of said air/fuel mixture out of said housing to do work.

14. The combustion system of claim 1, wherein said combustion chamber comprises a hollow housing having an external air flow input, an air flow output and an air flow pathway extending between said external air flow input and said air flow output, and said extraction means comprises means for maintaining and modulating over time a flow of external air into and through said combustion chamber such that said flow of external air undergoes controlled heating within said combustion chamber prior to its discharge from said combustion chamber via said air flow output.

15. The combustion system of claim 14, wherein said means for maintaining and modulating said flow of external air comprises a fan disposed at a location within said system such that ignition of said air/fuel mixture occurs downstream of said fan in said combustion chamber, and means for controlling air flow characteristics selected from the group consisting of air speed, air pressure and vortex combustion shape as said air/fuel mixture is burned associated with said air flow pathway upstream of said ignition of said air/fuel mixture.

16. The combustion system of claim 1, further comprising means for determining a work load demand level for heat energy to be extracted by said extracting means and means for controlling a rate of ignition of said air/fuel mixture in said combustion chamber in response to said determined work load demand level.

17. The combustion system of claim 1, wherein said work constitutes thermal work.

18. The combustion system of claim 1, wherein said work is mechanical work.

19. The combustion system of claim 1, wherein said elongate heating element defines an exterior surface and said cavity defines an interior surface, said exterior surface and said interior surface being respectively so configured as to interlock with one another when said elongate heating element is disposed within said cavity such that said elongate heating element is maintained in said cavity with said exterior surface of said elongate heating element in thermal contact with said heat/fuel interface material along said interior surface of said cavity.

20. A method of modulating a fuel flow in a combustion system comprising the steps of:

providing a combustion system comprising:

an air/fuel mixing region for forming an air/fuel mixture;

a combustion chamber for receiving via an outlet in said air/fuel mixing region, igniting at preselected intervals and burning said air/fuel mixture formed in said mixing region, at least one first input means for providing input air to said mixing region, at least one second input means for providing fuel to said mixing region, and extraction means for transferring heat energy produced by the burning of the air/fuel mixture out of the combustion chamber to perform work;

said at least one second input means including a fuel temperature management device comprising:
an enclosed volume having a first inlet for receiving fuel,
a second inlet for conducting external energy to the interior of said enclosed volume,
an outlet for discharging fuel to said mixing region, and
a heat/fuel interface disposed within said enclosed volume in communication with said external energy, wherein said heat/fuel interface defines a surface area of a size such that when the heat/fuel interface is maintained at substantially a predetermined fuel input temperature by said external energy, fuel flowing into said enclosed volume is quickly, precisely and substantially uniformly heated to said predetermined fuel input temperature prior to flowing outwardly of said enclosed volume into said mixing region via said outlet, and wherein said fuel temperature management device further comprises:
an elongate outer casing centered around a longitudinal axis,
an open rear input end,
a hollow tapered forward output end;
a heat/fuel interface material disposed in said casing, and defining a forward wall portion and side wall portions that together define a closed forward end disposed substantially adjacent to said forward tapered end of said casing, an open rear end spaced forwardly of said open rear end of said casing and a central longitudinal cavity extending from the open rear end of the heat/fuel interface material to said front wall thereof;
an elongate heating element disposed in said longitudinal cavity of said heat/fuel interface material in communication with said input external energy,
an exit nozzle communicating with the hollow interior of and extending substantially axially forward from said forward tapered end of said casing, and
an input nozzle affixed to a portion of the open rear end of said heat/fuel interface material and a seal disposed on the remainder of said open rear end of said heat/fuel interface material,
whereby said fuel temperature management device may be disposed in an input fuel line supplying fuel to said air/fuel mixing region such that input fuel enters said rear end of said heat/fuel interface material and fills voids present between the surfaces thereof while said heating element receives said external energy and heats the heat/fuel interface material surrounding it substantially uniformly and said fuel is thereafter discharged from the forward end portion of the fuel/interface material into said hollow tapered end of said casing and thence into said forwardly extending exit nozzle for transfer to the air/fuel mixing region;

introducing a liquid fuel flow into the combustion system wherein the fuel contained in the fuel flow has an initial temperature, an initial pressure, an initial resultant flow rate and an initial resultant fuel droplet size; and modulating the external energy conducted into the interior of said volume so as to modulate the temperature and pressure of said heat/fuel interface material whereby said fuel flow rate is caused to change.

21. A combustion system comprising:

an air/fuel mixing region for forming an air/fuel mixture;

a combustion chamber for receiving via an outlet in said air/fuel mixing region, igniting at preselected intervals and burning said air/fuel mixture formed in said mixing region, at least one first input means for providing input air to said mixing region, at least one second input means for providing a fluidic fuel at a substantially uniform predetermined temperature to said mixing region, and extraction means for transferring heat energy produced by the burning of the air/fuel mixture out of the combustion chamber to perform work;

said at least one second input means including a fuel management device comprising:
a hollow casing having an open rear fuel input end and an open forward fuel output end;
a heat/fuel interface material disposed in said casing, said heat/fuel interface material
(i) characterized by a surface area defining plurality of interconnected voids within said casing such that said surface area of said heat/fuel interface material is of a size such that when the heat/fuel interface material is maintained at said substantially predetermined temperature by an external energy source, fuel flowing through said voids is substantially immediately, precisely and substantially uniformly heated to said predetermined temperature, and
(ii) defining a forward wall portion and side wall portions that together form a cavity having a closed forward end disposed substantially adjacent to said forward fuel output end of said casing and an open rear end at said open rear input end of said casing;
a heating element disposed in said cavity in conductive relationship with said heat/fuel interface material for heating the same and in communication with said external energy source,
an exit nozzle attached to said open forward fuel output end of said casing, and
an input nozzle affixed to a portion of the heat/fuel interface material at the open rear input end of said casing and a closure member sealing the remainder of said open rear inlet end of said casing,
whereby said fuel temperature management device when disposed in said at least one second input means conveying fuel to said air/fuel mixing region controls the temperature of fuel input into said air/fuel mixing region so as to enable modulation of combustion and operational parameters of the combustion system.

22. The combustion system according to claim 21 wherein:

said at least one second input means comprises a single passive exit orifice providing flow rates and exit droplet sizes into said air/fuel mixing region that vary with the temperature and pressure of the fuel.

23. The combustion system according to claim 22 wherein: said single passive exit orifice so sized that when said fuel is fuel oil at 100° F. under a pressure of 100 psi said single passive exit orifice ejects fuel droplets having an average droplet size of 30 microns at an overall fuel flow rate of 0.75 gallons per hour, and when said fuel oil is at 250° F. under a pressure of 50 psi said single passive exit orifice ejects fuel droplets having an average droplet size of 30 microns at an overall rate of 0.375 gallons per hour.

24. The combustion system of claim 22 wherein said single passive exit orifice produces droplet sizes that vary inversely with the temperature of the heat/fuel interface material.

* * * * *